United States Patent [19]
Fujiwara et al.

[11] Patent Number: 5,301,411
[45] Date of Patent: Apr. 12, 1994

[54] ELONGATED WORK ASSEMBLING METHOD

[75] Inventors: Hideki Fujiwara, Higashihiroshima; Kanji Fujii, Hiroshima, both of Japan

[73] Assignee: Mazda Motor Corporation, Hiroshima, Japan

[21] Appl. No.: 904,965

[22] Filed: Jun. 26, 1992

[30] Foreign Application Priority Data

Jun. 28, 1991 [JP] Japan .................................. 3-158092
Jun. 28, 1991 [JP] Japan .................................. 3-158093
Sep. 26, 1991 [JP] Japan .................................. 3-247944

[51] Int. Cl.$^5$ ...................... B21D 39/03; B23P 11/00
[52] U.S. Cl. .................................. 29/430; 29/525.1
[58] Field of Search ............. 29/429, 430, 431, 432.1, 29/432.2, 525.1

[56] References Cited

U.S. PATENT DOCUMENTS 4,736,515  4/1988  Catena .
5,077,885  1/1992  Kanemitsu et al. .................... 29/430
5,155,891  10/1992  Yoshii et al. ........................... 29/430

FOREIGN PATENT DOCUMENTS 62-2780  1/1988  Japan .
63-2789  1/1988  Japan .

OTHER PUBLICATIONS

German Office Action dated Mar. 31, 1993 (with English translation).

*Primary Examiner*—Timothy V. Eley

[57] ABSTRACT

An elongated work assembling method and system for fastening a flexible elongated work having an integrated fixing member to a receive body includes a first placing step or apparatus for placing and fixing the elongated work on an attaching mechanism arranged at one side along a continuous convey direction of the receive body, a first fastening step or apparatus for fastening the placed elongated work to the attaching mechanism in substantially the same fastening state as a final fastening state to the receive body, a clamping step or apparatus for clamping the elongated work in the fastening state in the attaching mechanism, a fastening state releasing step or apparatus for releasing the fastening state of the elongated work to the attaching mechanism, a moving step or means for detaching from the attaching mechanism the elongated work released from the fastening state, and moving the detached elongated work to the receive body, and a second fastening step or apparatus for finally fastening the moved elongated work to the receive body from the other side along the continuous convey direction. The elongated work is fastened to the receive body through the above-mentioned assembly steps or assembly apparatus.

13 Claims, 27 Drawing Sheets

ELONGATED WORK ASSEMBLING METHOD

BACKGROUND OF THE INVENTION

1. Field of the Invention

The present invention relates to an elongated work assembling method and system for assembling an elongated work having flexibility to a receive body and, more specifically, to a technique suitably applied to an elongated work having flexibility such as bumpers, side laces, a rear trunk lace, a decoration garnish, and the like for a vehicle.

2. Description of the Related Art

Conventionally, in a technique for assembling, e.g., front and rear bumpers as elongated works to the front and rear portions of a vehicle body, various proposals have been made to improve work efficiency, and to improve positioning precision of attaching positions. For example, Japanese Laid-Open Patent No. 63-2780 discloses the following technique. That is, bumper jigs for clamping a bumper comprise nut runners, and the bumper satisfactorily clamped through the nut runners is attached to a vehicle body.

This disclosure will be described in detail below. A set table for placing a bumper and attaching bolts at predetermined positions, and a robot attached with jigs for clamping the bumper at its operating end are arranged beside a bumper fastening station of a vehicle assembling line. Each jig has a bumper receiver for gripping a bumper, a chucking pad, and a nut runner. A bumper placed on the set table and the attaching bolts are simultaneously received in a single operation, and the bumper is attached in a state wherein the bumper is aligned with the bumper attaching portion of the vehicle body.

When a work to be attached to a vehicle body is an elongated work such as a bumper, and the elongated work supported by jigs attached to an arm of a robot is to be aligned with the work attaching portion of a vehicle body, a plurality of reference pins or reference holes are set to match with the central positions of a plurality of reference holes or reference pins, and are then engaged with each other. Thereafter, the elongated work is attached and fastened to the work mounting portion of the vehicle body.

SUMMARY OF THE INVENTION

In recent years, an elongated work such as a bumper for a vehicle is formed not by a member having rigidity but by a member having flexibility such as a resin, and exhibits predetermined rigidity when it is attached to a vehicle body. For this reason, the bumper has a flexible outer shape before it is attached to the vehicle body.

As a result, in a stock unit for storing a large number of bumpers near an assembling station to a vehicle body, the bumpers have various storage positions, i.e., have different stock states. For this reason, when a bumper stored in the stock unit is to be clamped and picked up using a clamping mechanism mounted on an assembling robot, the clamping position of the bumper in the clamping mechanism cannot be precisely defined. In the worst case, the clamping mechanism cannot clamp the bumper.

Even if the bumper can be clamped, since its clamping position varies, attaching bolts fixed to the bumper cannot be inserted in attaching holes formed in a surface on which the bumper is to be attached of the vehicle body, and an assembling operation of the bumper to the vehicle body may be actually disabled.

According to the above-mentioned proposal, in an elongated work supported by jigs attached to an arm of a robot, the centers of a plurality of reference pins or holes provided to the elongated work cannot always coincide with the centers of a plurality of reference holes or pins provided to a work attaching portion of the vehicle body due to variations in the manufacture of bumpers.

Therefore, when an elongated work is, e.g., a bumper whose outer surface is subjected to final painting or plating, and is easily damaged, the bumper is supported by the jigs while the centers of the plurality of reference pins or holes provided to the bumper are shifted from the centers of the reference holes or pins provided to the work attaching portion of the vehicle body, and is conveyed to the position of the vehicle body. Thereafter, when the outer surface of the bumper (elongated work) is brought into contact with projecting portions of the vehicle body in the shifted state, a large external force may be applied to the bumper, thus damaging the outer surface.

The present invention has been made in consideration of the above situation, and has as its object to provide an elongated work assembling method and system, which can always accurately assemble an elongated work having flexibility, an integrated fixing portion, and a decorated outer surface to a receive body.

It is another object of the present invention to provide an elongated work assembling method and system, which can assemble a large number of types of elongated works to a receive body in addition to the above object.

It is still another object of the present invention to provide an elongated work assembling method and system, which can accurately regulate the clamping position of an elongated work by an assembling robot, and can reliably assemble the elongated work to a receive body in addition to the above objects.

It is still another object of the present invention to provide an elongated work assembling method and system, which can prevent a decorated outer surface portion of an elongated work from damage or the like even when the position of the elongated work is shifted from an attaching portion of a receive body.

It is still another object of the present invention to provide an elongated work assembling method and system, which can accurately assemble a bumper for a vehicle to the attaching portion of the vehicle.

It is still another object of the present invention to provide an elongated work assembling method and system, which can continuously, efficiently, and accurately assemble front and rear bumpers for a vehicle to the front and rear attaching portions of the vehicle in addition to the above objects.

It is still another object of the present invention to provide an elongated work assembling method and system, which can select one of various front bumpers for a vehicle, and can continuously, efficiently, and accurately assemble the selected bumper to the front attaching portion of the vehicle in addition to the above objects.

In order to achieve the above objects, according to the present invention, an elongated work assembling method for fastening a flexible elongated work having an integrated fixing member to a receive body, comprises the first placing step of placing and fixing the elongated work on an attaching mechanism arranged at one side along a continuous convey direction of the receive body, the first fastening step of fastening the placed elongated work to the attaching mechanism in a substantially same fastening state as a final fastening state to the receive body, the clamping step of clamping the elongated work in the fastening state to the attaching mechanism, the fastening state releasing step of releasing the fastening state of the elongated work in the attaching mechanism, the moving step of detaching from the attaching mechanism the elongated work released from the fastening state, and moving the detached elongated work to the receive body, and the second fastening step of finally fastening the moved elongated work to the receive body from the other side along the continuous convey direction. With this method, the elongated work is finally fastened to the receive body through the above-mentioned steps.

Preferably, an elongated work assembling method for fastening a large number of types of flexible elongated works, which have different total lengths in a longitudinal direction, different cross-sectional shapes each defining a portion of an outer surface, and different attaching positions of fixing members to be fastened to a receive body, to a receive portion of each of the receive bodies which are continuously conveyed from an upstream side to a downstream side, comprises the first placing step of placing the elongated work on an attaching mechanism arranged one side along a direction of a continuous convey operation using the fixing member of the elongated work, the first fastening step of fastening the placed elongated work to the attaching mechanism in a substantially same fastening state as a final fastening state to the receive body, the clamping state of clamping the elongated work using the cross-sectional shape of the elongated work in the fastening state to the attaching mechanism, the fastening state releasing step of releasing the fastening state of the elongated work in the attaching mechanism, the moving step of detaching from the attaching mechanism the elongated work released from the fastening state, and moving the detached elongated work to a position opposing the receive portion of the receive body, and the second fastening step of finally fastening the moved elongated work to the receive body from the other side along the direction of the continuous convey operation. With this method, the elongated work is finally fastened to the receive body through the above-mentioned steps.

Preferably, in an elongated work assembling method for fastening a large number of types of flexible front bumpers, which have different total lengths in a longitudinal direction, different cross-sectional shapes each defining a portion of an outer surface, and different attaching positions of fixing members to be fastened to a vehicle, to a receive portion of each of the vehicles which are continuously conveyed from an upstream side to a downstream side, the front bumper is finally fastened to the front receive portion in a first stop station comprising the first placing step, the first fastening step, the clamping step, the fastening state releasing step, the moving step, and the second fastening step, the rear bumper is finally fastened to the rear receive portion in a second stop station comprising the first placing step, the first fastening step, the clamping step, the fastening state releasing step, the moving step, and the second fastening step, and the first and second stop stations are arranged along the direction of the continuous convey operation of the vehicle to finally fasten the front and rear bumpers.

Preferably, an elongated work assembling system for fastening a flexible elongated work having an integrated fixing member to a receive body, comprises first placing means for placing and fixing the elongated work to an attaching mechanism arranged at one side along a continuous convey direction of the receive body, first fastening means for fastening the placed elongated work to the attaching mechanism in a substantially same fastening state as a final fastening state to the receive body, clamping means for clamping the elongated work in the fastening state to the attaching mechanism, fastening state releasing means for releasing the fastening state of the elongated work in the attaching mechanism, moving means for detaching from the attaching mechanism the elongated work released from the fastening state, and moving the detached elongated work to the receive body, and second fastening means for finally fastening the moved elongated work to the receive body from the other side along the continuous convey direction. With this system, the elongated work is finally fastened to the receive body through the above-mentioned means.

Preferably, an elongated work assembling system for fastening, a large number of types of flexible elongated works, which have different total lengths in a longitudinal direction, different cross-sectional shapes each defining a portion of an outer surface, and different attaching positions of fixing members to be fastened to a receive body, to a receive portion of each of the receive bodies which are continuously conveyed from an upstream side to a downstream side, comprises first placing means for placing the elongated work on an attaching mechanism arranged one side along a direction of a continuous convey operation using the fixing member of the elongated work, first fastening means for fastening the placed elongated work to the attaching mechanism in a substantially same fastening state as a final fastening state to the receive body, clamping means for clamping the elongated work using the cross-sectional shape of the elongated work in the fastening state to the attaching mechanism, fastening state releasing means for releasing the fastening state of the elongated work in the attaching mechanism, moving means for detaching from the attaching mechanism the elongated work released from the fastening state, and moving the detached elongated work to a position opposing the receive portion of the receive body, and second fastening means for finally fastening the moved elongated work to the receive body from the other side along the direction of the continuous convey operation. With this system, the elongated work is finally fastened to the receive body through the above-mentioned means.

Preferably, in an elongated work assembling system for fastening a large number of types of flexible front bumpers, which have different total lengths in a longitudinal direction, different cross-sectional shapes each defining a portion of an outer surface, and different attaching positions of fixing members to be fastened to a vehicle, to a receive portion of each of the vehicles which are continuously conveyed from an upstream side to a downstream side, the front bumper is finally fastened to the front receive portion in a first stop station comprising the first placing means, the first fastening means, the clamping means, the fastening state releasing means, the moving means, and the second fastening means, the rear bumper is finally fastened to the rear receive portion in a second stop station comprising the first placing means, the first fastening means, the clamping means, the fastening state releasing means, the moving means, and the second fastening means, and the first and second stop stations are arranged along the direction of the continuous convey operation of the vehicle to finally fasten the front and rear bumpers.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The arrangement of an embodiment of a bumper assembling method and system as an elongated work assembling method and system according to the present invention will be described hereinafter with reference o to the accompanying drawings.

Overall Arrangement

The overall arrangement of a bumper assembling system 10 will be briefly described below with reference to FIGS. 1 through 7.

General Description

Figure 1:
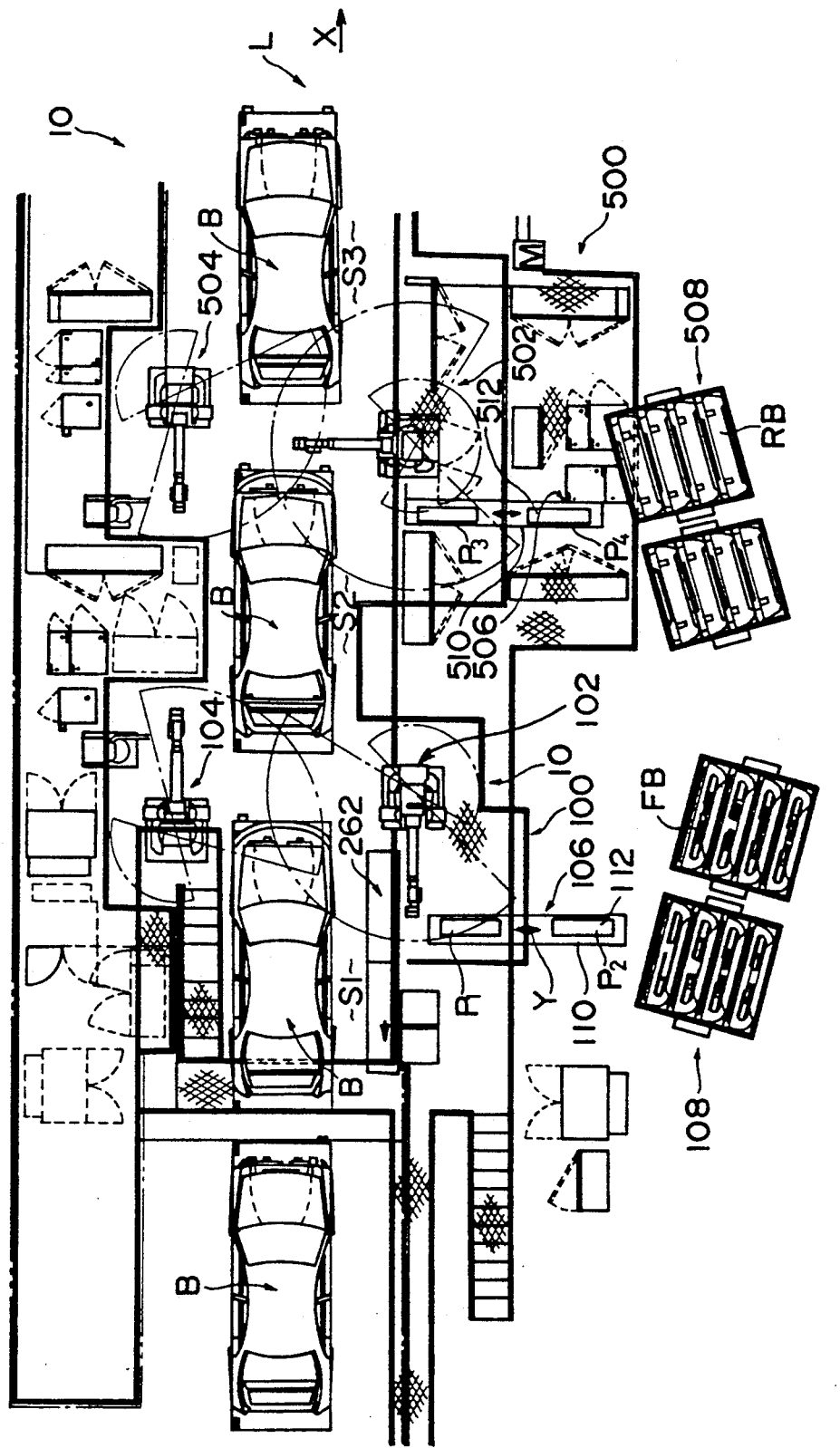
FIG. 1 is a schematic top view showing the arrangement of a bumper assembling system, which adopts an embodiment of an elongated word assembling system according to the present invention.

As shown in FIG. 1, the bumper assembling system 10 is arranged along a vehicle body convey line L along which vehicle bodies before assembling of bumpers are conveyed. In the vehicle body convey line L, vehicle bodies B are tact-conveyed along a vehicle body convey direction X. Every time the vehicle bodies are conveyed by a predetermined pitch, they are stopped for a predetermined period of time, and predetermined machining and assembling works are carried out during this stop time interval. The bumper assembling system 10 is arranged to extend across three successive stop stations S1, S2, and S3. A front bumper assembling station 100 is arranged in the most upstream-side stop station in the convey direction of the vehicle body B, and a rear bumper assembling station 500 is arranged in the most downstream-side stop station S3. The middle stop station S2 does not carry out any work as an idle station.

Description of Bumper

As an elongated work of the present invention, as described above, a bumper is applied in this embodiment. As the bumpers, there are two types of bumpers, i.e., a front bumper FB assembled to the front portion of the vehicle body B, and a rear bumper RB assembled to the rear portion. A large number of types of front and rear bumpers FR and RB are present depending on the types, grades, and the like of vehicles to which these bumpers are attached.

However, in this embodiment, in order to improve workability of the assembling work to the vehicle body, the front bumpers FB are classified into two types, i.e., large- and small-size front bumpers from the viewpoint of the assembling work, and the outer surface shapes to be gripped are classified into a maximum of 12 types.

Figure 2:
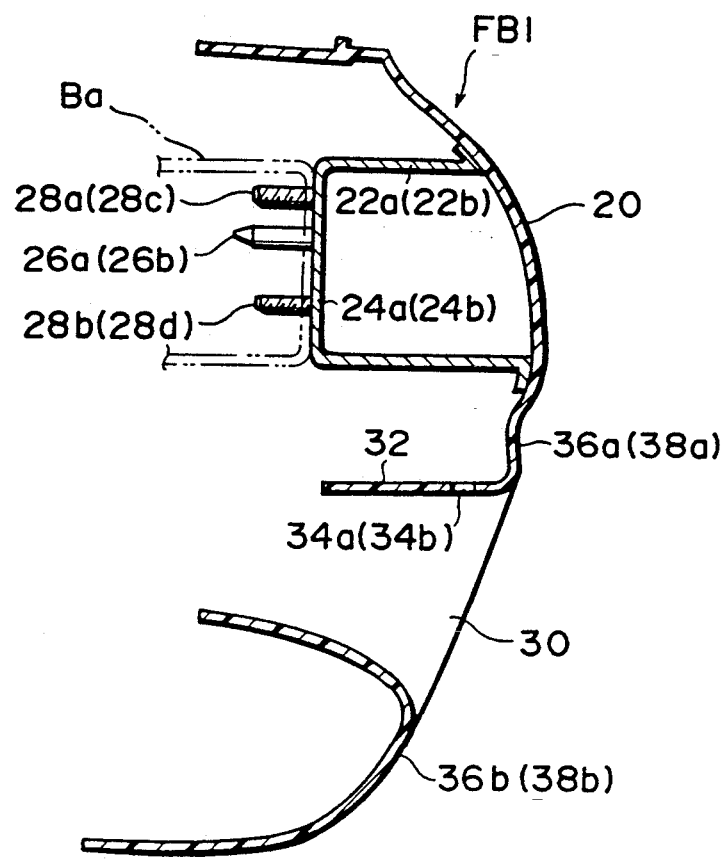
FIG. 2 is a longitudinal sectional view showing a large-size front bumper as an elongated work serving as an object of the present invention.

More specifically, as shown in FIG. 2, a large-size front bumper FB1 is constituted by a bumper main body 20 formed of a soft synthetic resin, a pair of right and left attaching bases 24a and 24b integrally attached to the inner side surface of the bumper main body 20 through a pair of right and left stays 22a and 22b, a pair of positioning reference pins 26a and 26b which are integrally fixed to the attaching bases 24a and 24b to project backward, are attached at accurately regulated positions, and are separated in the widthwise direction of the vehicle body by a first distance D1, and pairs of attaching bolts 28a and 28b; and 28c and 28d, which are arranged around the corresponding reference pins 26a and 26b on the attaching bases 24a and 24b, and are firmly fixed to project backward.

As shown in FIG. 2, in the widthwise direction of the vehicle body, the front surface of the large-size front bumper FB1 has an opening 30 for taking air into an engine room. The opening 30 is constituted in such a manner that the bumper main body 20 is bent backward from the circumferential edge defining the opening 30, and integrally extends backward by a predetermined distance. Of the backward extending portions, an upper portion 32 is formed with positioning holes 34a and 34b (FIG. 2 illustrates only the positioning hole 34a), which are located at the two ends in the widthwise direction of the vehicle body, and extend through the bumper main body in the direction of thickness, for defining the gripping reference positions when the front bumper FB1 is gripped by a gripping mechanism 270 of a clamp device 260 equipped in a first robot 102 (to be described later). Outer surfaces 36a and 36b; and 38a and 38b (FIG. 2 illustrates only the outer surfaces 36a and 36b) of the portions of the bumper main body 20, which portions are located near the positioning holes 34a and 34b, and above and below the opening 30, are defined as surfaces to be gripped by the gripping mechanism 270. In this embodiment, a maximum of six types of the surfaces 36a and 36b; and 38a and 38b to be gripped are present in this embodiment according to the types of the large-size front bumper FB1, as described above.

Figure 3:
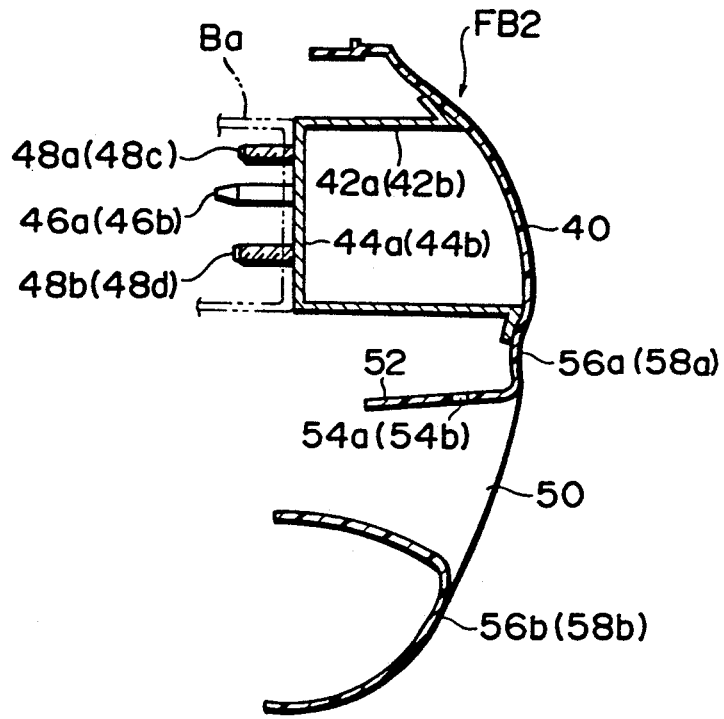
FIG. 3 is a longitudinal sectional view showing a small-size front bumper as an elongated work serving as an object of the present invention.

On the other hand, as shown in FIG. 3, a small-size front bumper FB2 is constituted by a bumper main body 40 formed of a synthetic resin, a pair of right and left attaching bases 44a and 44b integrally attached to the inner side surface of the bumper main body 40 through a pair of right and left stays 42a and 42b, positioning reference pins 46a and 46b which are integrally fixed to the attaching bases 44a and 44b to project backward, are attached at accurately regulated positions, and are separated in the widthwise direction of the vehicle body by a distance D2 smaller than the distance D1 between the pair of positioning reference pins 26a and 26b of the large-size front bumper FB1, and pairs of attaching bolts 48a and 48b; and 48c and 48d, which are arranged around the corresponding reference pins 46a and 46b on the attaching bases 44a and 44b, and are firmly fixed to project backward.

As shown in FIG. 3, in the widthwise direction of the vehicle body, the front surface of the small-size front bumper FB2 has an opening 50 for taking air into an engine room. The opening 50 is constituted in such a manner that the bumper main body 40 is bent backward from the circumferential edge defining the opening 50, and integrally extends backward by a predetermined distance. Of the backward extending portions, an upper portion 52 is formed with positioning holes 54a and 54b (FIG. 3 illustrates only the positioning hole 54a), which are located at the two ends in the widthwise direction of the vehicle body, and extend through the bumper main body in the thickness direction, for defining the gripping reference positions upon when the front bumper FB2 is gripped by the gripping mechanism 270 (to be described later).

Outer surfaces 56a and 56b; and 58a and 58b (FIG. 3 illustrates only the outer surfaces 56a and 56b) of the portions of the bumper main body 40, which portions are located near the positioning holes 54a and 54b, and above and below the opening 50, are defined as surfaces to be gripped by the gripping mechanism 270. In this embodiment, a maximum of six types of the surfaces 56a and 56b; and 58a and 58b to be gripped are present in this embodiment according to the types of the small-size front bumper FB2, as described above.

More specifically, the front bumper FB comprises the pair of reference pins 26a and 26b (46a and 46b), and the two pairs of attaching bolts 28a to 28d (48a to 48d) according to the large or small size.

Figure 4:
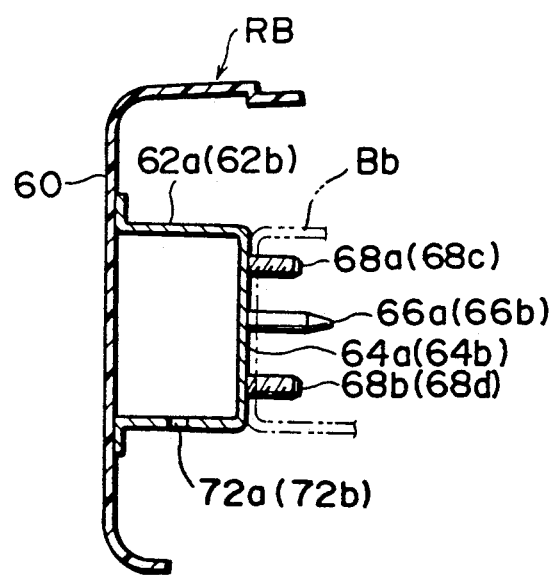
FIG. 4 is a longitudinal sectional view showing a rear bumper as an elongated work serving as an object of the present invention.

On the other hand, the rear bumper RB is classified into a single type regardless of bumper sizes from the viewpoint of the assembling work, and the outer surface shapes to be gripped are classified into a maximum of 16 types. More specifically, as shown in FIG. 4, the rear bumper RB is constituted by a bumper main body 60, a pair of right and left attaching bases 64a and 64b integrally attached to the inner side surface of the bumper main body 60 through a pair of right and left stays 62a and 62b, positioning reference pins 66a and 66b, which are integrally fixed to the attaching bases 64a and 64b, are located at accurately regulated positions, and are separated in the widthwise direction of the vehicle body by a third distance D3, pairs of attaching bolts 68a and 68b; and 68c and 68d, which are arranged around the corresponding reference pins 66a and 66b on the attaching bases 64a and 64b, and are firmly fixed to project forward, and attaching holes 70a and 70b defined by elongated holes extending along the widthwise direction of the vehicle body (i.e., a BL direction to be described later).

The rear bumper RB does not have the air intake opening 30 or 50 unlike in the front bumper FB.

The above-mentioned reference pins 26a and 26b; 46a and 46b; and 66a and 66b are formed into a conically tapered shape to have sharp distal ends so as to allow an easy positioning operation.

General Description of Front Bumper Assembling Station

Figure 5:
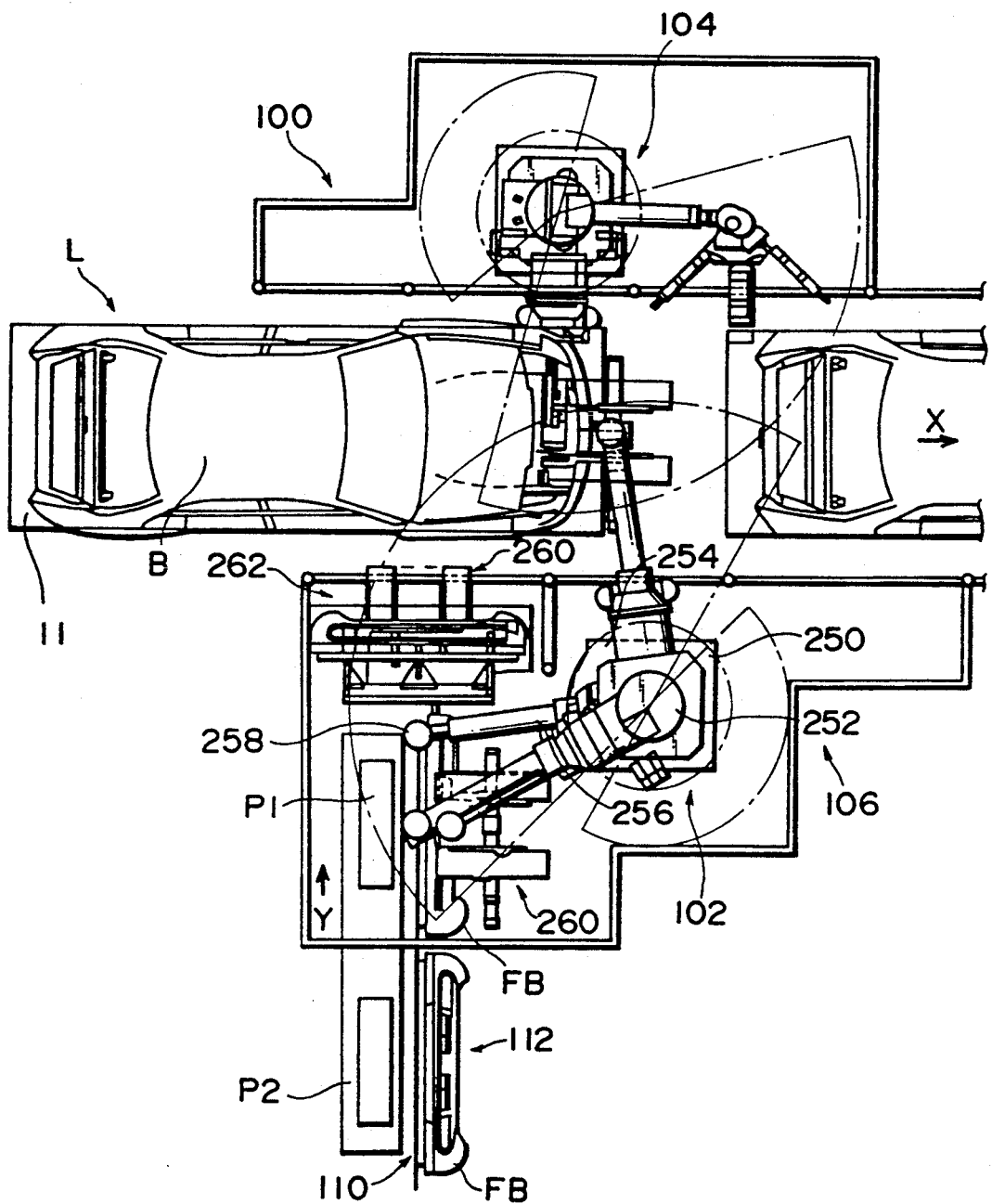
FIG. 5 is an enlarged top view showing the arrangement of a front bumper assembling station of the bumper assembling system shown in FIG. 1.

The front bumper assembling station 100 is arranged for assembling the front bumper FB to the front portion of the vehicle body B stopped at the station 100. As shown in FIG. 5, the front bumper mounting robot (to be simply referred to as the first robot hereinafter) 102 for gripping the front bumper FB, and mounting it on the front portion of the vehicle body B is arranged in the station 100 at one side along the convey direction X of the vehicle body B. At the other side along the convey direction X of the vehicle body B, i.e., at the side opposite to the first robot 102, a front bumper fixing robot (to be simply referred to as a second robot hereinafter) 104 for threadably fitting nuts (to be described later) on the attaching bolts 28a through 28d (48a through 48d) of the front bumper FB mounted on the front portion of the vehicle body B by the first robot 102, and assembling the front bumper FB to be fixed to the front portion of the vehicle body B is arranged.

The front bumper assembling station 100 comprises a front bumper supply apparatus 106 for supplying the front bumper FB to the first robot 102, and a front bumper stock unit 108, located at one side of the front bumper supply apparatus 106, for stocking a large number of front bumpers FB. The front bumper supply apparatus 106 has a supply position P1 for supplying the front bumper FB to the first robot 102, and a receive position P2 for receiving the front bumper FB supplied from the front bumper stock unit 108. The supply position P1 and the receive position P2 are separated along a supply direction Y perpendicular to the convey direction X of the vehicle body B. The front bumper supply apparatus 106 comprises an attaching mechanism 112 on which the front bumper FB is attached, and a convey mechanism 110 for reciprocally moving the attaching mechanism 112 between the two positions to convey the front bumper FB received at the receive position P2 to the supply position P1.

Figure 7:
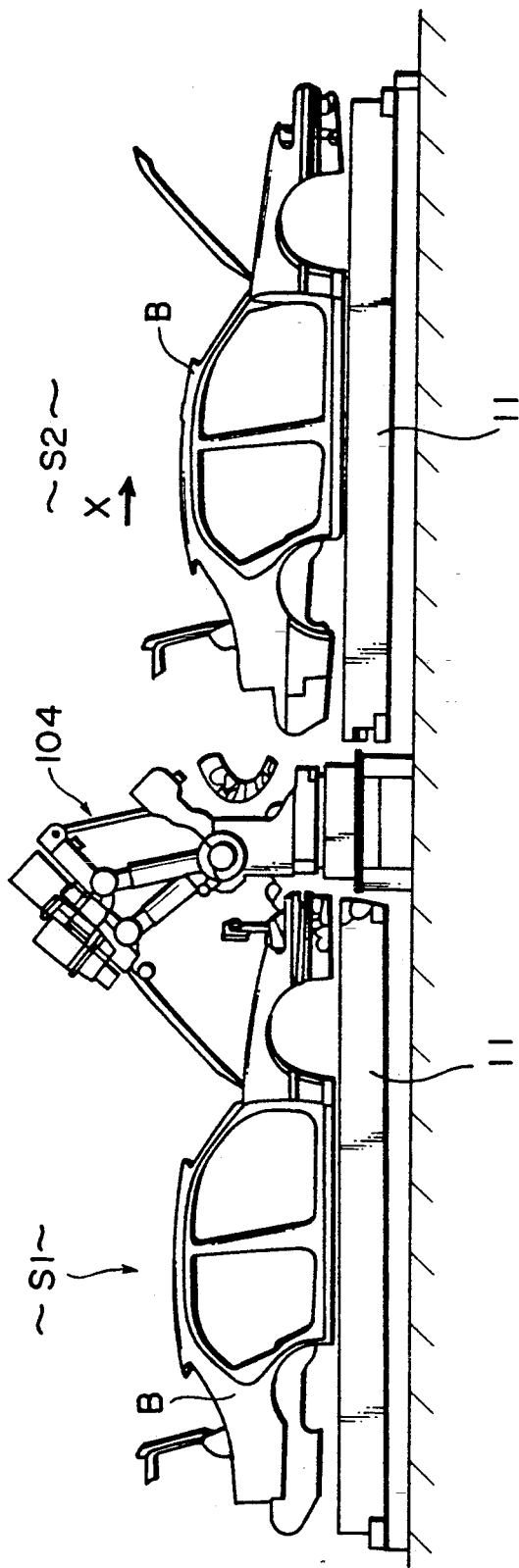
FIG. 7 is a front view showing the arrangement of a second robot equipped in the front bumper assembling station shown in FIG. 5.

In the front bumper assembling station 100 which is basically arranged as described above, the front bumper FB is supplied from the front bumper stock unit 108 to the receive position P2 of the front bumper supply apparatus 106 by a manual operation of an operator. At the receive position P2, as a characteristic feature of the present invention, the front bumper FB is attached and fixed on the attaching mechanism 112 in the same state as the attaching state to the vehicle body B. The front bumper FB, which is attached and fixed on the attaching mechanism 112 in the same state as the attaching state to the vehicle body B, is automatically conveyed to the supply position P1 by the convey operation of the convey mechanism 110. Thereafter, the first robot 102 is started and grips the front bumper FB attached on the attaching mechanism 112 in the same state as the attaching state to the vehicle body B. In this gripping state, only the fixing state of the front bumper FB is released. The first robot 102 detaches the front bumper FB from the supply position P1, conveys it to the front portion of the vehicle body B, and mounts it thereon. The gripping state of the front bumper FB by the first robot 102 allows an accurate and reliable mounting operation of the front bumper FB to the front portion of the vehicle body B since the front bumper FB is attached to the attaching mechanism 112 in the same state as the attaching state to the front portion of the vehicle body B. Finally, the front bumper FB mounted on the front portion of the vehicle body B by the first robot 102 is fixed through the nuts by the second robot 104, as shown in FIG. 7. In this manner, a series of assembling operations of the front bumper FB to the front portion of the vehicle body B are completed.

Figure 6:
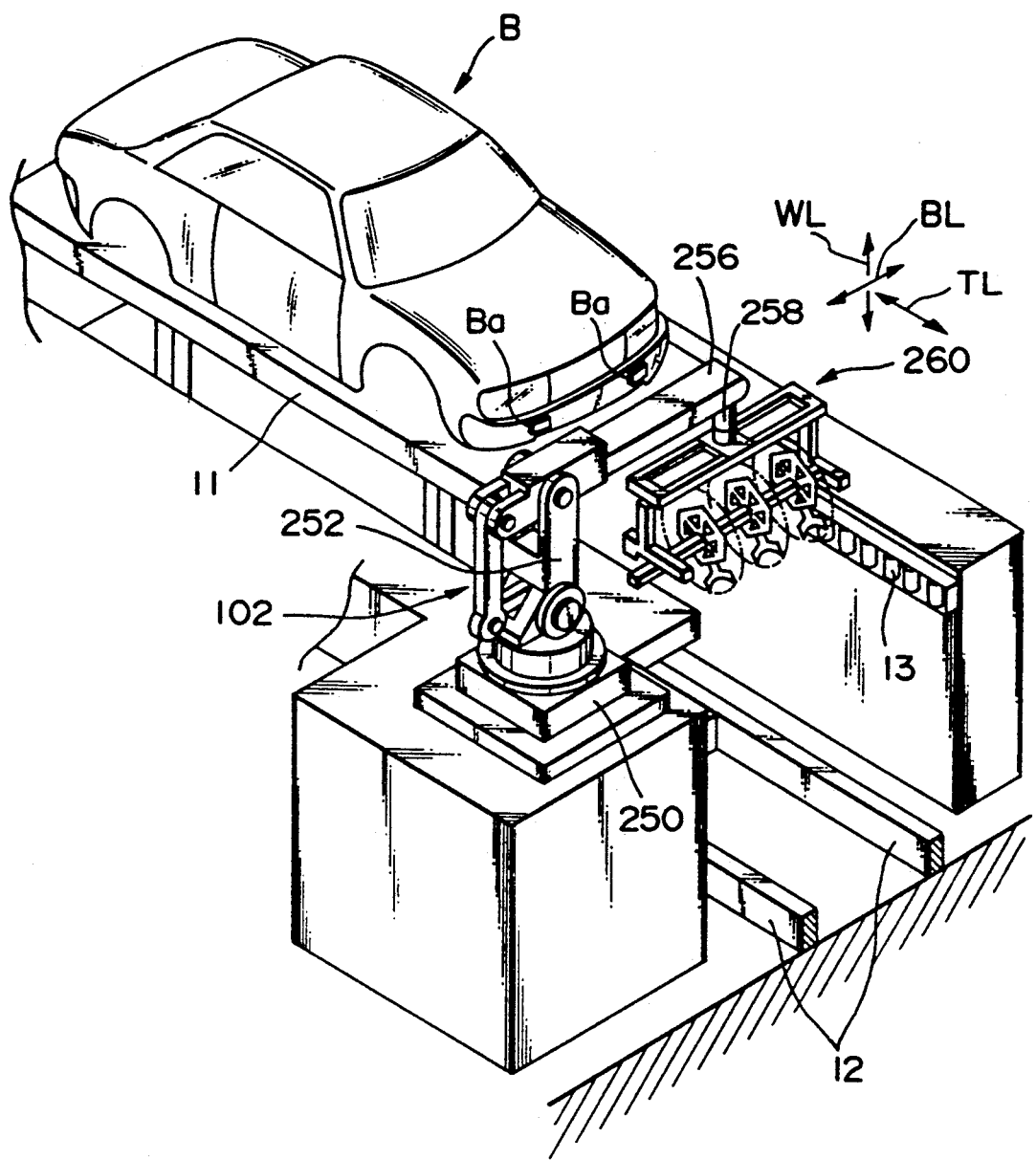
FIG. 6 is a perspective view showing the arrangement of the front bumper assembling station of the bumper assembling system shown in FIG. 1.

As shown in FIG. 6, in order to mount the front bumper FB on a front portion Ba of the vehicle body B, the vehicle body B is carried on a convey pallet 11. The convey pallet 11 is conveyed and guided along rails 12 while its right-and-left direction is regulated by guide rollers 13, and is conveyed in a TL direction in FIG. 6.

General Description of Rear Bumper Assembling Station

As illustrated in FIG. 1, the rear bumper assembling station 500 is arranged for assembling the rear bumper RB to the rear portion of the vehicle body B stopped at the station 500, and basically has the same arrangement as that of the above-mentioned front bumper assembling station 100. More specifically, in this rear bumper assembling station 500, a rear bumper mounting robot (to be simply referred to as a third robot hereinafter) 502 for gripping the rear bumper RB, and mounting it on the rear portion of the vehicle body B is arranged at one side along the convey direction of the vehicle body B. At the other side along the convey direction of the vehicle body B, a rear bumper fixing robot (to be simply referred to as a fourth robot hereinafter) for threadably fitting nuts on the attaching bolts 68a through 68d of the rear bumper RB (FIG. 4) mounted on the rear portion of the vehicle body B by the third robot 502, and assembling the rear bumper RB to be fixed to the rear portion of the vehicle body B is arranged.

The rear bumper assembling station 500 comprises a rear bumper supply apparatus 506 for supplying the rear bumper RB to the third robot 502, and a rear bumper stock unit 508, located at one side of the rear bumper supply apparatus 506, for stocking a large number of rear bumpers RB. The rear bumper supply apparatus 506 has a supply position P3 for supplying the rear bumper RB to the third robot 502, and a receive position P4 for receiving the rear bumper RB supplied from the rear bumper stock unit 508. The supply position P3 and the receive position P4 are separated along a direction perpendicular to the convey direction of the vehicle body B. The rear bumper supply apparatus 506 comprises an attaching mechanism 512 on which the rear bumper RB is attached, and a convey mechanism 510 for reciprocally moving the attaching mechanism 512 between the two positions to convey the rear bumper RB received at the receive position P4 to the supply position P3.

In the rear bumper assembling station 500 which is basically arranged as described above, the rear bumper RB is supplied from the rear bumper stock unit 508 to the receive position P4 of the rear bumper supply apparatus 506 by a manual operation of an operator. At the receive position P4, as a characteristic feature of the present invention, the rear bumper RB is attached and fixed on the attaching mechanism 512 in the same state as the attaching state to the rear portion of the vehicle body B. The rear bumper RB, which is attached and fixed on the attaching mechanism 512 in the same state as the attaching state to the rear portion of the vehicle body B, is automatically conveyed to the supply position P3 by the convey operation of the convey mechanism 510. Thereafter, the third robot 502 is started and grips the rear bumper RB attached to the attaching mechanism 512 in the same state as the attaching state to the vehicle body B. In this gripping state, only the fixing state of the rear bumper RB is released. The third robot 502 detaches the rear bumper RB from the supply position P3, conveys it to the rear portion of the vehicle body B, and mounts it thereon. The gripping state of the rear bumper RB by the third robot 502 allows an accurate and reliable mounting operation of the rear bumper RB to the rear portion of the vehicle body B since the rear bumper RB is attached to the attaching mechanism 512 in the same state as the attaching state to the vehicle body B. Finally, the rear bumper RB mounted on the rear portion of the vehicle body B by the third robot 502 is fixed through the nuts by the fourth robot 504. In this manner, a series of assembling operations of the rear bumper RB to the rear portion of the vehicle body B are completed.

Detailed Description of Front Bumper Assembling Station 100

The arrangement of the front bumper assembling station 100 will be described in detail hereinafter with reference through FIGS. 8 to 25.

Description of Arrangement of Front Bumper Supply Apparatus 106

The details of the front bumper supply apparatus 106 constituting the front bumper assembling station 100 will be explained below with reference through FIGS. 8 to 13.

The front bumper supply apparatus 106 is constituted to convey the front bumper FB supplied from the front bumper stock unit 108 by a manual operation of an operator to the supply position so as to supply it to the first robot 102. More specifically, the front bumper supply apparatus 106 further comprises the attaching mechanism 112 for attaching the front bumper FB in the same state as the attaching state to the front portion of the vehicle body B in addition to the above-mentioned convey mechanism 110.

Description of Convey Mechanism 110

Figure 8:
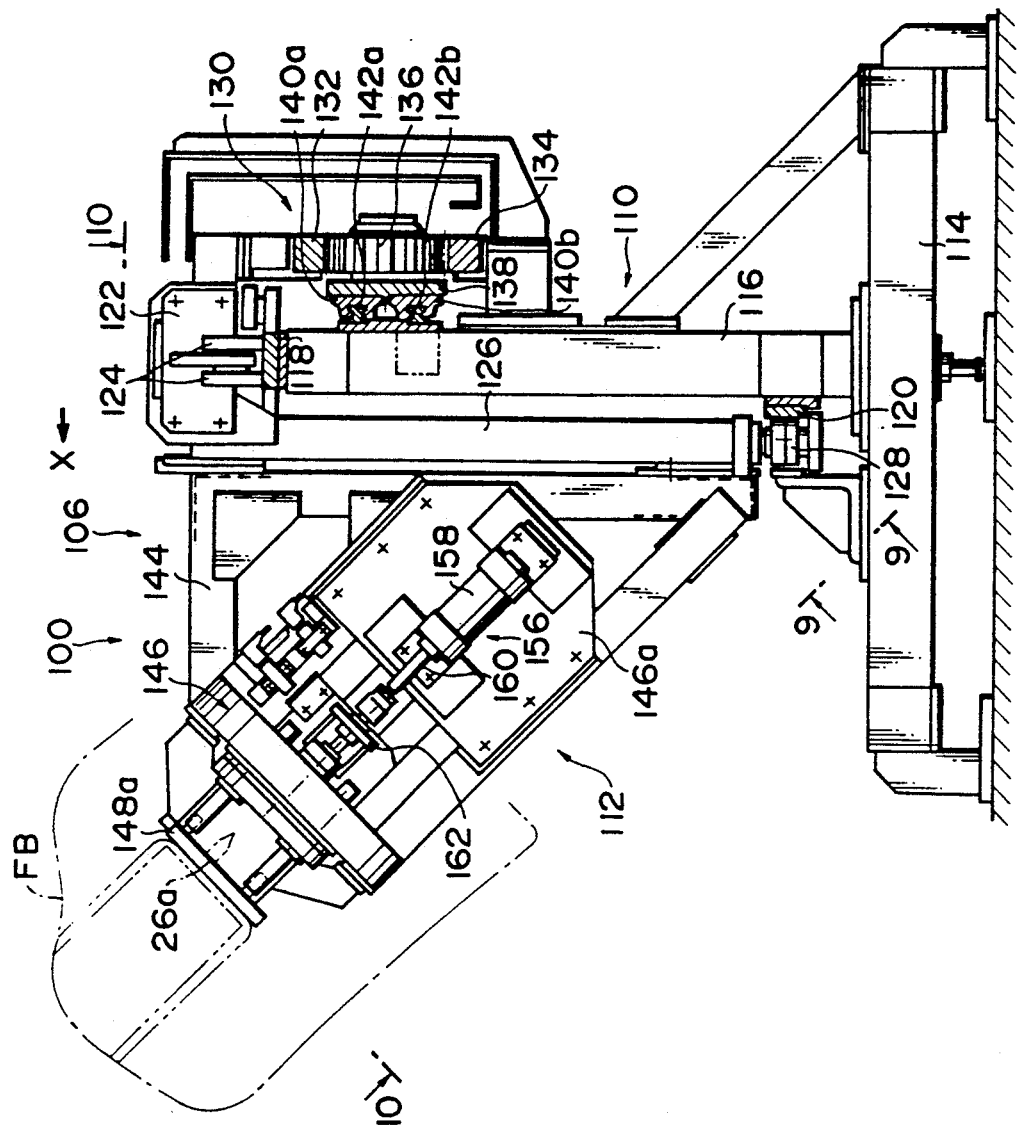
FIG. 8 is a longitudinal sectional view showing the arrangement of a front bumper supply apparatus equipped in the front bumper assembling station.

As shown in FIG. 8, the convey mechanism 110 comprises a convey table 114 extending in the supply direction Y perpendicular to the convey direction X of the vehicle body convey line L (in FIG. 8, extending in a direction perpendicular to the drawing surface). A rail stand 116 extending in the supply direction Y stands upright on the convey table 114. A first rail 118 is horizontally attached to the upper surface of the rail stand 116. A second rail 120 is vertically attached to a lower portion of one side surface (the left side surface in FIG. 8; the right side surface in FIG. 1) of the rail stand 116. A movable block 112 is mounted on the convey table 114 to be reciprocally movable between the supply position P1 and the receive position P2 along the above-mentioned supply direction Y. More specifically, first wheels 124 are attached to the movable block 112 to be rotatably movable along the first rail 118, and to be rotatable about the horizontal axis. A downward extending attaching member 126 is attached to one side surface of the movable block 122. A second wheel 128 is attached to the lower end of the attaching member 126 to be rotatably movable along the above-mentioned second rail 120 from aside, and to be rotatable about the vertical axis. The attaching mechanism 112 is attached to the attaching member 126 to be inclined upward by 45° from the horizontal line, as will be described in detail later. A driving mechanism 130 for reciprocally moving the movable block 122 between the supply position P1 and the receive position P2 is connected to the movable block 122. The driving mechanism 130 is constituted by a first rack (movable rack) 132, which is integrally attached to the other side surface of the movable block 11 to extend in the supply direction Y and has a toothed surface formed on its lower surface, a second rack (stationary rack) 134, which is integrally attached to the other side surface of the rail stand at a position below the first rack 132 to extend in the supply direction Y and has a toothed surface formed on its upper surface, a pinion gear 136 located between the first and second racks 132 and 134 and simultaneously meshing with the two toothed surfaces, an upright movable base 138 for pivotally and axially supporting the pinion gear 136 about the horizontal axis, a pair of upper and lower guide bushings 140a and 140b fixed to one side surface of the movable base 138, a pair of upper and lower guide rails 142a and 142b, which are respectively engaged with these guide bushings 140a and 140b, and are attached to the other side surface of the rail stand 116 to extend in the supply direction Y so as to regulate the moving direction of the movable base 138 in the supply direction Y, and an air cylinder mechanism (not shown) as a driving source, connected to the movable base 138, for moving the movable base 138 along the supply direction Y.

Since the convey mechanism 110 is arranged, as described above, when the air cylinder mechanism in the driving mechanism 130 is activated, the movable block 122 is moved between the supply position P1 and the receive position P2 along the supply direction Y at a speed twice the moving direction of the movable base 138.

Description of Attaching Mechanism 112

The attaching mechanism 112 is arranged to be able to attach the front bumper FB, which is manually picked up from the front bumper stock unit 108 by an operator and is supplied to the attaching mechanism 112, in the same state as the attaching state to the vehicle body B. In the attaching mechanism 112, in order to improve work efficiency of an operator, the attaching direction of the front bumper FB is set to be inclined upward at 45° with respect to the horizontal line, as can be seen from FIG. 8.

More specifically, the attaching mechanism 112 comprises a frame-like attaching frame 146, which is attached to one side surface of the attaching member 126 in the convey mechanism 112 through a stay 144 to have the central axis inclined upward at 45° with respect to the horizontal line. On the upper surface (i.e., a surface perpendicular to the central axis) of the attaching frame 146, as shown in FIG. 8, a pair of first receive bases 148a and 148b for receiving the large-size front bumpers FB1 are arranged to be located at the two ends along the supply direction Y, and a pair of second receive bases 150a and 150b for receiving the small-size front bumper FB2 are arranged inside the first receive bases 148a and 148b. Note that the upper surfaces of the first and second receive bases 148a and 148b; and 150a and 150b are set to have the same level from the upper surface of the attaching frame 146.

Figure 9:
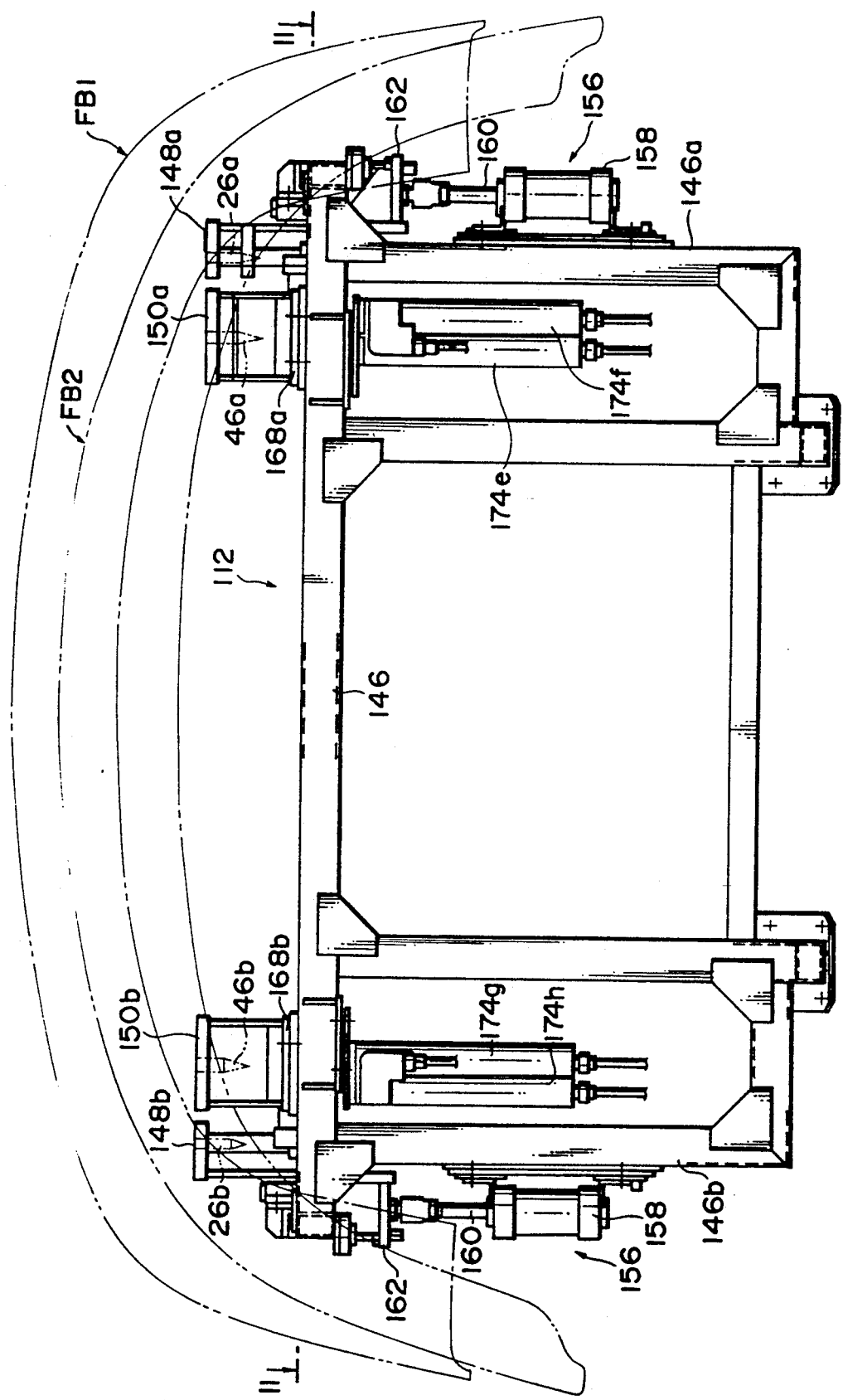
FIG. 9 is a sectional view showing the front bumper supply apparatus when viewed along a line 9—9 in FIG. 8.

On receive surfaces defined by the upper surfaces of the two first receive bases 148a and 148b, as shown in FIG. 9, reference holes 152a and 152b for respectively receiving the corresponding reference pins 26a and 26b, and attaching holes 154a and 154b; and 154c and 154d for respectively receiving the corresponding pairs of attaching bolts 28a and 28b; and 28c and 28d are formed to extend therethrough in the direction of thickness. The positions of the two reference holes 152a and 152b are accurately regulated so that the holes are separated by the above-mentioned first distance D1. Although not shown, the receive surfaces of the first receive bases 148a and 148b are regulated to have the same shapes and positions as those of the receive surfaces of the large-size front bumpers FB1 attached to the front portion of the vehicle body.

Description of Escape Mechanism 156

Figure 10:
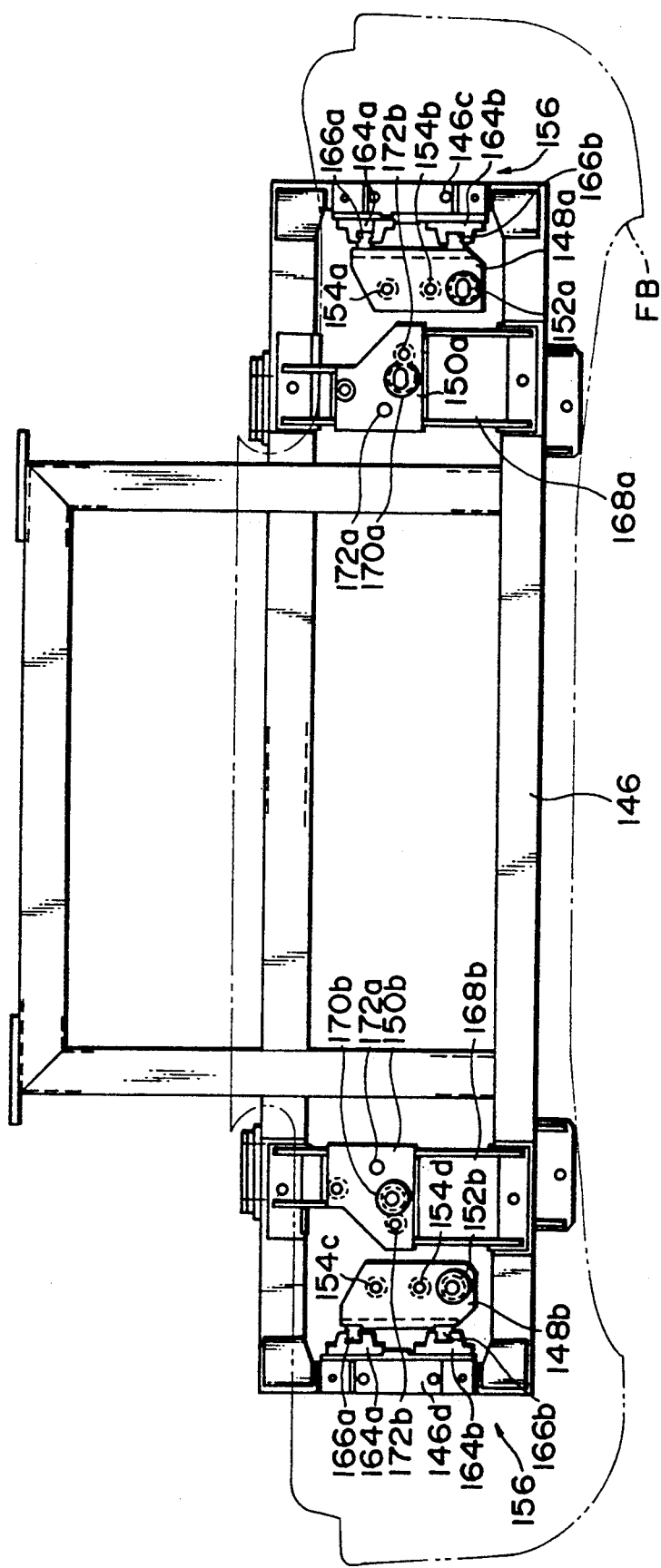
FIG. 10 is a sectional view showing the front bumper supply apparatus when viewed along a line 10—10 in FIG. 8.
Figure 11:
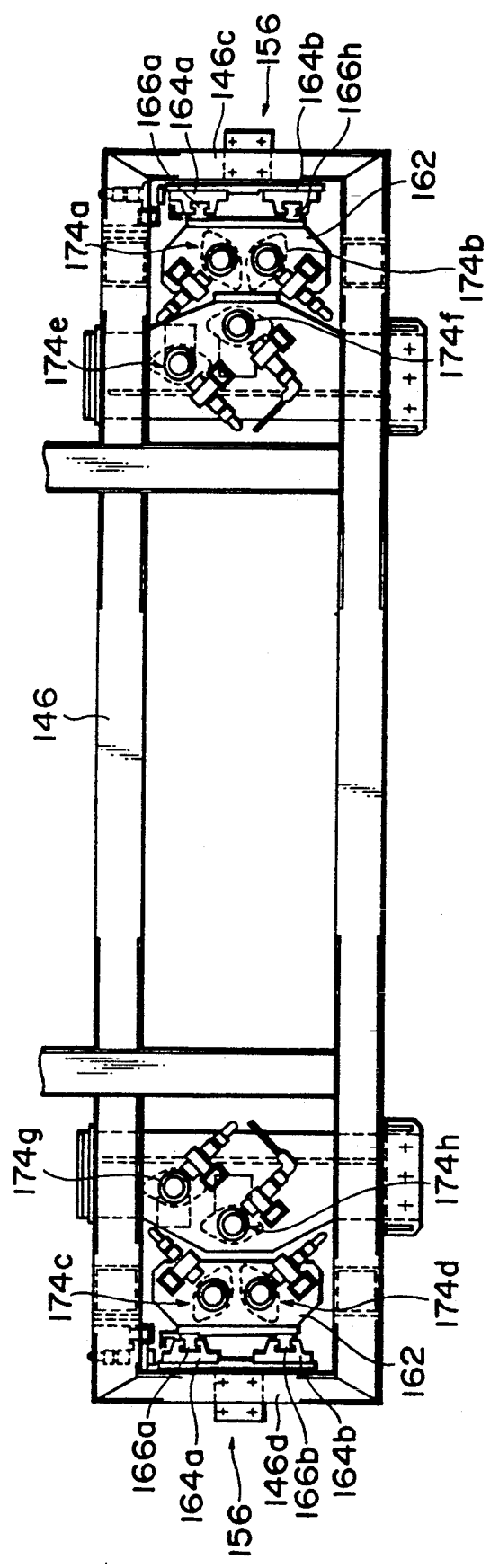
FIG. 11 is a sectional view showing the front bumper supply apparatus taken along a line 11—11 in FIG. 9.
Figure 12:
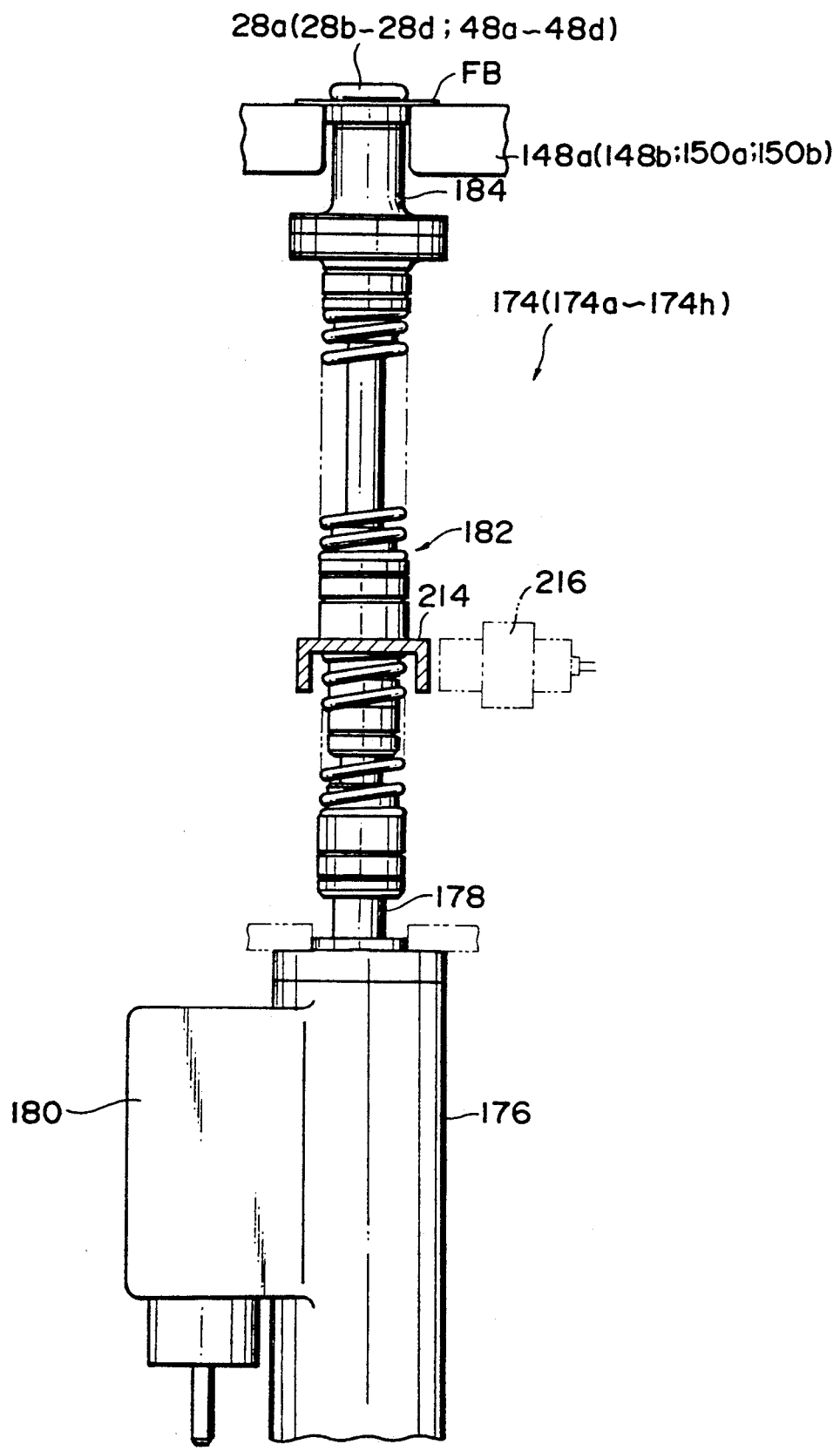
FIG. 12 is a front view showing a nut runner mechanism equipped in the front bumper supply apparatus.

Since the first receive bases 148a and 148b are arranged to receive the large-size front bumper FB1, the presence of these bases disturbs reception of the small-size front bumper FB2. For this reason, upon reception of the small-size front bumper FB2, the first receive bases 148a and 148b are respectively supported by escape mechanisms 156 so as to escape downward upon reception of the small-size front bumper FB2 and not to disturb the reception operation. As shown in FIGS. 9 and 10, each escape mechanism 156 is constituted by an air cylinder 158 fixed to a corresponding one of frame members 146a and 146b on two sides of the attaching frame 146 to extend along the central axis, a piston rod 160 attached to be inwardly retractable from each air cylinder 158 along the central axis, a support base 162, fixed to the distal end of each piston rod 160, for supporting a corresponding one of the first receive bases 148a and 148b, a pair of guide bushings 164a and 164b fixed to the inner side surface of a corresponding one of attaching frames 146c and 146d respectively fixed to the frame members 146a and 146b, and a pair of guide rails 166a and 166b, fitted in these guide bushings 164a and 164b, and attached to the outer side surface of the corresponding support base 162 to extend along the central axis, for regulating the moving direction of the support base 162 in a direction along the central axis (the guide bushings 164a and 164b, and the guide rails 166a and 166b are also illustrated in FIG. 11).

Since the escape mechanism 156 is arranged, as described above, each piston rod is held at an outwardly projecting position, and in this state, the large-size front bumper FB1 can be received by the two first receive bases 148a and 148b. On the other hand, when the small-size front bumper FB2 is to be received, the escape mechanisms 156 are started to retract the piston rods 160 into the corresponding air cylinders 158. As a result, the two first receive bases 148a and 148b are retracted, and the small-size front bumper FB2 can be received by the two receive bases 150a and 150b.

On the other hand, the two second receive bases 150a and 150b are fixed to the upper surface of the attaching frame 146 through stays 168a and 168b. On receive surfaces defined by the upper surfaces of the two second receive bases 150a and 150b, reference holes 170a and 170b for respectively receiving the reference pins 46a and 46b of the small-size front bumper FB2, and attaching holes 172a and 172b; and 172c and 172d for respectively receiving the corresponding pairs of attaching bolts 48a and 48b; and 48c and 48d are formed to extend therethrough in the direction of thickness. The positions of the two reference holes 170a and 170b are accurately regulated so that the two holes are separated by the above-mentioned second distance D2. Although not shown, the receive surfaces of the second receive bases 150a and 150b are regulated to have the same shapes and positions as those of the receive surfaces of the small-size front bumpers FB2 attached to the front portion of the vehicle body.

Description of Nut Runner Mechanisms 174a through 174h

In order to fix the front bumper FB attached to the attaching mechanism 112 in the same state as the attaching state to the vehicle body B, the attaching mechanism 112 comprises a total of eight nut runner mechanisms 174a through 174d; and 174e to 174h in correspondence with the four attaching bolts 28a through 28d and the four attaching bolts 48a through 48d of the large- and small-size front bumpers. Of these nut runner mechanisms 174a through 174d; and 174e through 174h, as shown in FIG. 11, two each of the four nut runner mechanisms 174a through 174d for respectively fixing the attaching bolts 28a through 28d inserted through the total of four attaching holes 154a through 154d formed in the first receive bases 148a and 148b for the large-size front bumper FB1 are attached under the corresponding escapable support bases 162 to extend through the bases 162 along the central axis. On the other hand, two each of the four nut runner mechanisms 174e through 174h for fixing the attaching bolts 48a through 48d inserted through the total of four attaching holes 172a and 172d formed in the second receive bases 150a and 150b for the small-size front bumper FB2 are attached under the fixed stays 168a and 168b to extend through the stays along the central axis.

Detailed Arrangement of Nut Runner Mechanism 174

The arrangement of the nut runner mechanisms 174a through 174d will be described in detail below. In this case, since these mechanisms have the same arrangement, a nut runner mechanism denoted by reference numeral 174 in FIGS. 12 and 13 will be explained below.

Figure 13:
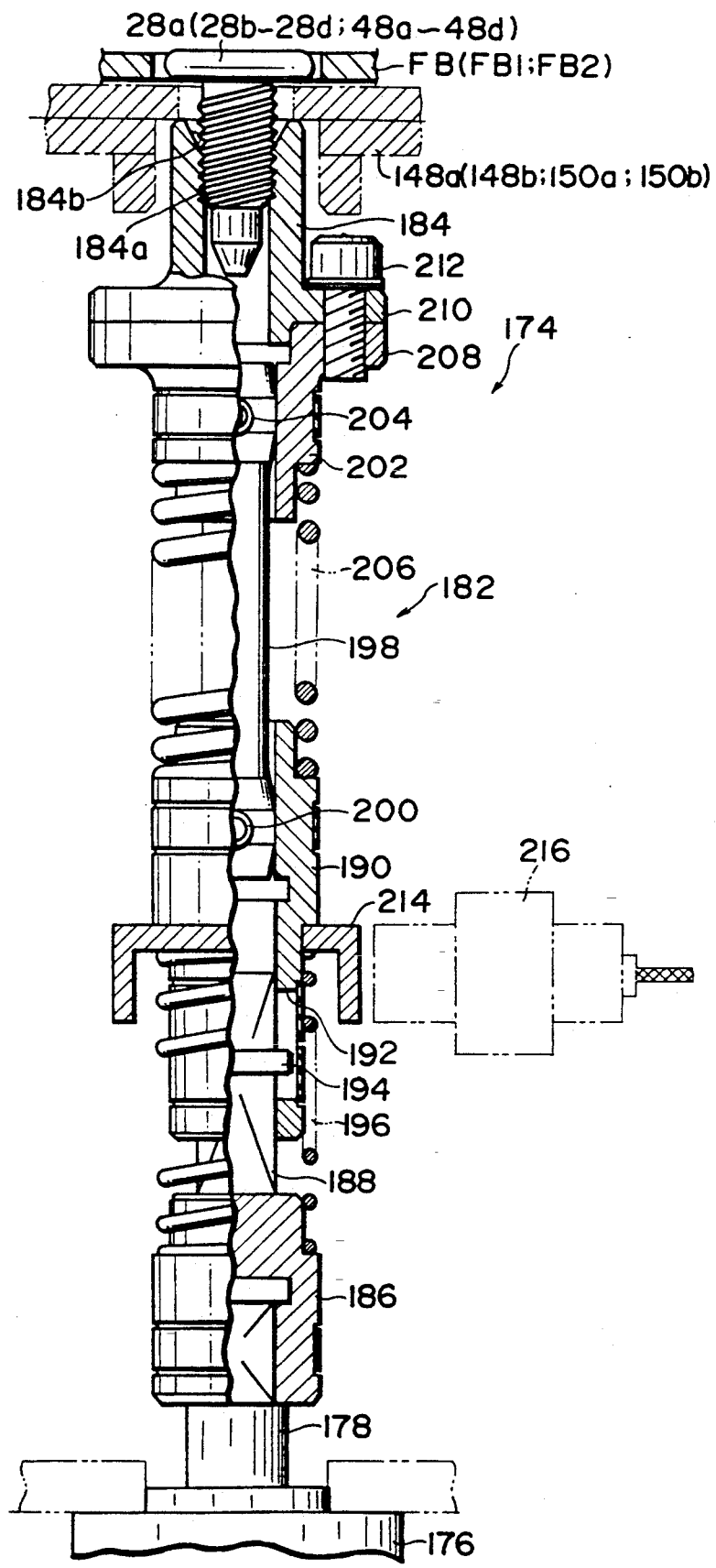
FIG. 13 is a partial sectional view showing the details of the arrangement of the nut runner mechanism shown in FIG. 12.

As shown in FIG. 13, the nut runner mechanism 174 comprises an air cylinder 176 fixed to a corresponding attaching portion (i.e., the support base 162, or the stay 168a or 168b), a piston rod 178, which can project outwardly (upward in FIG. 13) from the air cylinder 176, a driving motor 180 for rotating the piston rod 178 at a predetermined rotational speed, a nut portion 184 integrally attached to the distal end of the piston rod 178 through a simple universal joint mechanism 182, and threadably fitted on the corresponding attaching bolt (28a to 28d, 48a to 48d).

As shown in FIG. 13, the simple universal joint mechanism 182 comprises a large-diameter shaft portion 186 fixed to the distal end of the piston rod 178 to be rotated together, and a small-diameter second shaft portion 188 coaxially and integrally formed on the upper portion of the first shaft portion 186. A lower portion of a coupling sleeve 190 is fitted on the outer circumferential surface of the second shaft portion 188 to be slidable in the axial direction. An axially extending guide groove 192 is formed in the outer circumferential surface of the coupling sleeve 190 to extend therethrough in the radial direction. A radially extending lock pin 194 is fixed to the second shaft portion 188 while being fitted in the guide groove 192. In this manner, the coupling sleeve 190 is rotated integrally with the second shaft portion 188, which is rotated integrally with the piston rod 178, so as to be movable in the axial direction.

A first coil spring 196 is interposed between the first shaft portion 186 and the coupling sleeve 190. More specifically, the coupling sleeve 190 is always biased by the biasing force of the first coil spring 196 in a direction to project outwardly. When an external force in a direction to push in the coupling sleeve 190 is applied, the first coil spring 190 contracts in the axial direction, thus allowing the push-in movement of the coupling sleeve 190.

On the other hand, the lower end of a coupling shaft 198 is pivotally fitted in the upper portion of the coupling sleeve 190. The outer circumferential surface of the coupling shaft 198 is defined by a spherical surface, and a first lock pin 200 is attached to extend through the spherical surface in the radial direction. The two ends of the first lock pin 200 is pivotally and axially supported on the outer circumferential surface of the coupling sleeve 190. In this manner, the coupling sleeve 190 and the coupling shaft 198 are integrally rotated to be pivotal about the first lock pin 200.

A third shaft portion 202 is pivotally fitted on the outer circumferential surface of the upper end of the coupling shaft 198. The outer circumferential surface of the upper end of the coupling shaft 198 is defined by a spherical surface, and a second lock pin 204 is attached to extend through the spherical surface in the same direction as the extending direction of the first lock pin 200, i.e., in the radial direction. The two ends of the second lock pin 204 are pivotally supported on the outer circumferential surface of the third shaft portion 202. In this manner, the coupling shaft 198 and the third shaft portion 202 are integrally rotated to be pivotal about the second lock pin 204. As a result, upon rotation of the piston rod 178, the third shaft portion 202 is rotated about a rotational axis different from that of the piston rod 178.

A second coil spring 206 is interposed between the coupling sleeve 190 and the third shaft portion 202. The biasing force of the second coil spring 206 is set to be larger than that of the above-mentioned first coil spring 196. The relative position between coupling sleeve 190 and the third shaft portion 202 is elastically maintained to be substantially coaxial with each other through the second coil spring 206.

An attaching flange 208 is integrally formed on the outer circumferential surface of the upper end of the third shaft portion 202, and an attaching flange 210 is also integrally formed on the outer circumferential surface of the lower end of the above-mentioned nut portion 184. The nut portion 184 is mounted on the upper portion of the third shaft portion 202, and when the two flanges 208 and 210 are coupled through a bolt 212, the nut portion 184 is integrally attached to the third shaft portion 202. As shown in FIG. 13, the nut portion 184 is formed with a female threaded surface 184a, which is threadably engaged with the corresponding attaching bolt (28a through 28d; 48a through 48d), and a tapered portion 184b is formed on the open end edge thereof so as to be able to reliably receive the corresponding attaching bolt (28a through 28d; 48a through 48d).

A detection dog 214 is attached to the outer circumferential surface of the above-mentioned coupling sleeve 190. A sensor 216 for detecting that the detection dog 214 is moved upward to its uppermost position is arranged aside the detection dog 214. Since the sensor 216 is arranged in this manner, it can be reliably detected that the coupling sleeve 190, i.e., the nut portion 184 is moved upward to its uppermost position.

Since the nut runner mechanism 174 is arranged as described above, the corresponding attaching bolts 28a through 28d; or 48a through 28d inserted through the attaching holes 154a to 154d; or 172a to 172d are threadably engaged with the nut portions 184 by the corresponding nut runner mechanisms 174a through 174d; or 174e through 174h. Therefore, the large- or small-size front bumper FB1 or FB2 is attached and fixed on the first receive bases 148a and 148b or the second receive bases 150a and 150b of the attaching mechanism 112.

More specifically, when each nut runner mechanism 174 is activated, the air cylinder 176 begins to be driven, and the piston rod 178 projects upward. As a result, the nut portion 184 is brought into contact with the male threaded portion of the corresponding attaching bolt (28a through 28d; 48a to 48d) from the below. Upon this contact operation, the nut portion 184 receives a force in a direction to be relatively pushed downward. Therefore, upon application of the push-down force, the first coil spring 196 contracts along the axis direction, the lock pin 194 slides in the guide groove 194 along the axial direction, and the coupling sleeve 190 is retracted in the second shaft portion 188, thus allowing the downward relative movement of the nut portion 184.

The driving operation of the driving motor 180 is started to rotate the piston rod 178. As a result, the nut portion 184 is rotated about its own central axis, and begins to be threadably engaged with the corresponding attaching bolt (28a through 28d; 48a through 48d). With this threadable engagement, the nut portion 184 is moved upward while being rotated. The upward movement of the nut portion 184 is allowed since the first coil spring 196 extends along the axial direction, the lock pin 194 slides in the guide groove 192 along the axial direction, and the coupling sleeve 190 projects upward from the second shaft portion 188.

In this manner, the nut portion 184 is moved upward to its uppermost position, and is completely threadably engaged with the corresponding attaching bolt (28a through 28d; 48a through 48d). Attainment of this threadable engaging state (i.e., a fixing state) is recognized in such a manner that the above-mentioned sensor 216 detects the detection dog 214 to detect that the nut portion 214 is moved upward to its uppermost position, and at the same time, the torque load of the driving motor 180 is abruptly increased. Thus, the driving operation of the nut runner mechanism 174 is stopped.

Description of Operation of Front Bumper Supply Apparatus 106

The supply operations of the large- and small-size front bumpers FB1 and FB2 in the front bumper supply apparatus 106 with the above-mentioned arrangement will be respectively described below.

When the large-size front bumper FB1 is to be supplied, an operator manually picks up the corresponding front bumper FB1 from the front bumper stock unit 108, sets the attaching mechanism 112 in a mode for attaching the large-size front bumper FB1 using a mode setting button (not shown), and then attaches the front bumper FB1 to the attaching mechanism 112 waiting at the receive position P2. More specifically, in this attaching operation, the operator attaches the front bumper FB1 to the attaching mechanism 112 so that the pair of reference pins 26a and 26b formed on the front bumper FB1 are respectively inserted in the reference holes 152a and 152b respectively formed in the right and left first receive bases 148a and 148b. In this manner, when the pair of reference pins 26a and 26b are respectively inserted in the corresponding reference holes 152a and 152b, the total of four attaching bolts 28a, 28b, 28c, and 28d are respectively inserted in the pairs of attaching holes 154a and 154b; and 154c and 154d, respectively formed in the right and left first receive bases 148a and 148b. Thereafter, the nut runner mechanisms 174a through 174d, arranged in correspondence with the large-size front bumper FB1, are respectively driven. As a result, the nut runner mechanisms 174a through 174d are respectively threadably engaged with the corresponding attaching bolts 28a through 28d, and the front bumper FB1 is attached and fixed on the attaching mechanism 112 waiting at the receive position.

This fixing state is set to be perfectly the same as the attaching/fixing state to the front portion of the vehicle body B, as described above.

Thereafter, the convey mechanism 110 is started to convey the attaching mechanism 112, on which the large-size front bumper FB1 is attached and fixed, from the receive position P2 to the supply position P1. When a sensor (not shown) detects that the attaching mechanism 112 is conveyed to the supply position P1, the driving operation of the convey mechanism 110 is stopped, and a gripping/pick-up operation by the first robot 102 is waited.

On the other hand, when the small-size front bumper FB2 is to be supplied, an operator manually picks up the corresponding front bumper FB2 from the front bumper stock unit 108, sets the attaching mechanism 112 in a mode for attaching the small-size front bumper FB2 using the mode setting button (not shown), and attaches the front bumper FB2 to the attaching mechanism 112 waiting at the receive position P2. When the mode for attaching the small-size front bumper FB2 is set, the escape mechanisms 156 are enabled, and the first receive bases 148a and 148b for receiving the large-size front bumper FB1 are pushed downward, and hence, the second receive bases 150a and 150b are ready to receive the small-size front bumper FB2 in turn.

In this attaching operation, the operator attaches the front bumper FB2 to the attaching mechanism 112 so that the pair of reference pins 46a and 46b formed on the front bumper FB2 are respectively inserted in the reference holes 170a and 170b respectively formed in the right and left second receive bases 150a and 150b. Since the pair of reference pins 46a and 46b are respectively inserted in the corresponding reference holes 170a and 170b in this manner, the total of four attaching bolts 48a, 48b, 48c, and 48d are respectively inserted in the pairs of attaching holes 172a and 172b; and 172c and 172d respectively formed in the right and left second receive bases 150a and 150b.

Thereafter, the nut runner mechanisms 174e through 174h, arranged in correspondence with the small-size front bumper FB2, are respectively, driven. As a result, the nut runner mechanisms 174e through 174h are respectively threadably engaged with the corresponding attaching bolts 48a through 48d, and the front bumper FB2 is attached and fixed on the attaching mechanism 112 waiting at the receive position P2.

This fixing state is set to be perfectly the same as the attaching/fixing state to the front portion of the vehicle body B, as described above.

Thereafter, the convey mechanism 110 is started to convey the attaching mechanism 112, on which the small-size front bumper FB2 is attached and fixed, from the receive position P2 to the supply position P1. When a sensor (not shown) detects that the attaching mechanism 112 is conveyed to the supply position P1, the driving operation of the convey mechanism 110 is stopped, and a gripping/pick-up operation by the first robot 102 is waited. Description of Arrangement of First Robot 102

The arrangement of the first robot 102 as the front bumper mounting robot for clamping the front bumper FB attached to the attaching mechanism 112 conveyed to the supply position P1, conveying it to the front portion of the vehicle body B, and mounting it thereon will be described in detail below with reference to FIGS. 14 through 23.

Overall Arrangement of First Robot 102

As shown in FIG. 5, the first robot 102 basically comprises a base 250 arranged on a foundation (not shown), a vertical arm 252 attached on the base 250 to be pivotal about the vertical axis, and to be vertically movable along the vertical axis, a first horizontal arm 254 horizontally extending from the upper end of the vertical arm 252, a second horizontal arm 256 attached to the first horizontal arm 254 to be able to project from or be retracted into the arm 254, a hand 258 mounted on the lower surface of the distal end of the second horizontal arm 256, and a clamp device 260, detachably attached to the hand 258, for clamping the front bumper FB. The vertical arm 252 is rotated about the vertical axis and is vertically driven along the vertical axis in an independent state by a pivot mechanism and a vertical driving mechanism (neither are shown). The second horizontal arm 256 projects from or is retracted into the first horizontal arm 254 by a projection mechanism (not shown).

Since the first robot 102 is arranged in this manner, the clamp device 260 attached to the distal end of the horizontal arm 256 through the hand 258 can be moved to an arbitrary position within a work range of the first robot 102. The work range is set to have a substantially fan shape when viewed from the top, as shown in FIG. 5, by the vertical moving range of the vertical arm 252, the pivotal range of the vertical arm 252, and the projection range of the second horizontal arm 256.

Since the arrangement and operation of the clamp device 260 in the first robot 102 are the characteristic features of the present invention, and other arrangements are the same as those in the conventional apparatus, only the arrangement of the clamp device 260 will be described in detail below.

General Description of Clamp Device 260

As the clamp device 260, two different clamp devices, i.e., first and second clamp devices 260A and 260B are prepared, and are selectively detachably attached to the second horizontal arm 256 through the hand 258. Each of the first and second clamp devices 260A and 260B is arranged to be able to selectively clamp a maximum of six different outer surface shapes of the large- and small-size front bumpers FB1 and FB2. More specifically, in this embodiment, the first and second clamp devices 260A and 260B can selectively clamp the large-size front bumpers FB1 having a maximum of 12 different outer shapes, and the small-size front bumpers FB2 having a maximum of 12 different outer shapes. A waiting clamp device 260, which is not attached to the second horizontal arm 256 through the hand 258, is placed and kept in a waiting unit 262 arranged adjacent to both the convey mechanism 110 and the first robot 102, as shown in FIG. 5.

Figure 14:
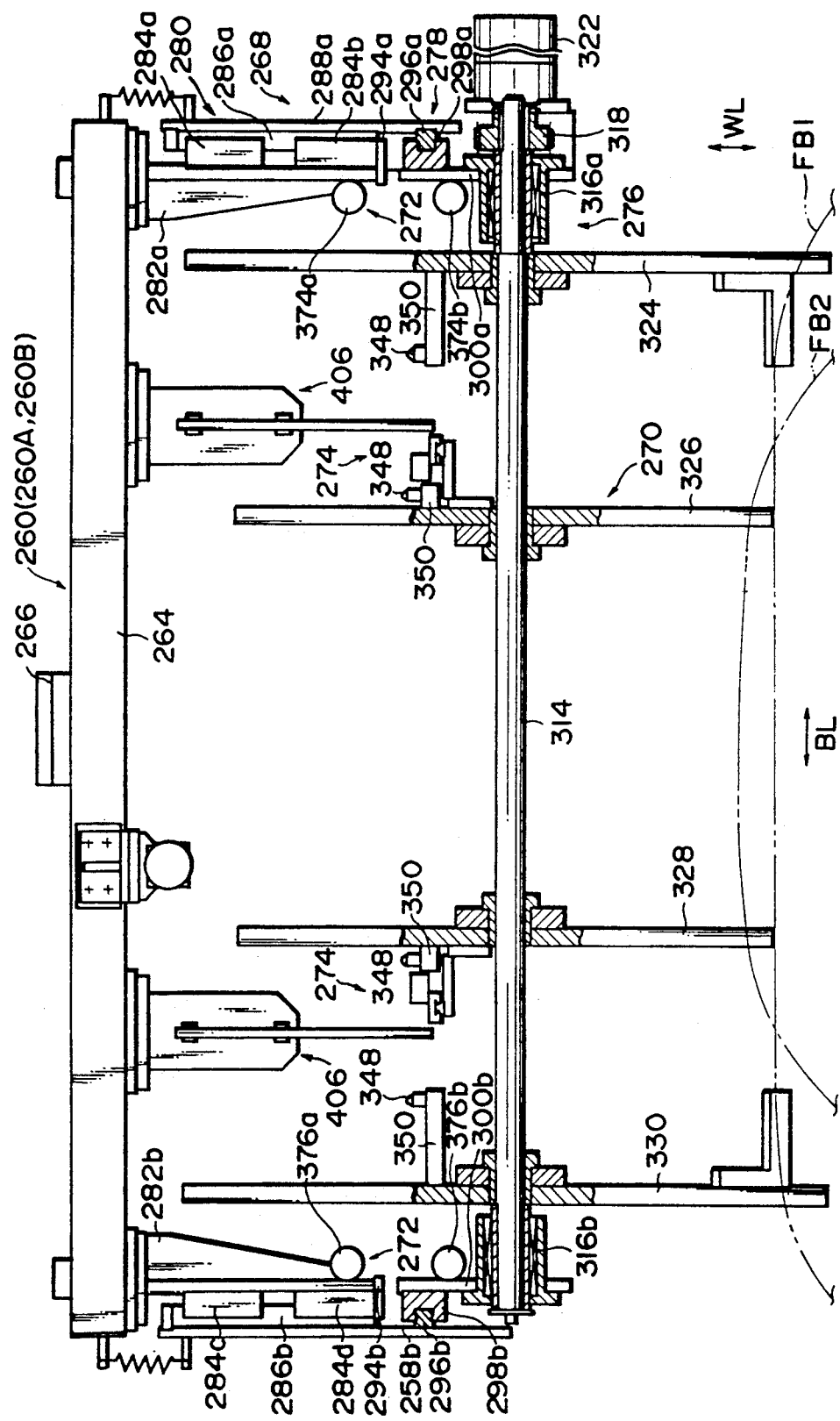
FIG. 14 is a front view showing the arrangement of a clamp device detachably attached to the first robot equipped in the front bumper assembling station.

Since the first and second clamp devices 260A and 260B have substantially the same arrangement except for a gripping surface shape (to be described later), in the following description, the arrangement of the clamp device denoted by reference numeral 260 will be described below, and only when the two clamp devices must be discriminated from each other, "A" or "B" will be attached to reference numeral 260. As shown in FIG. 14, the clamp device 260 has a horizontally extending frame 264, and an attachment portion 266 to be attached to the above-mentioned hand 258 is arranged at the central portion on the upper surface of the frame 264. The clamp device 260 comprises a gripping mechanism 270 for gripping the outer surface of the front bumper FB, chucking mechanisms 272 for chucking the outer surface of the front bumper FB by suction, and lock mechanisms 274 for locking the front bumper FB, which mechanisms are arranged below the frame 264 through a 3-axis floating device 268, so that displacements in the three axial directions are allowed. In this embodiment, the gripping mechanism 270, the chucking mechanisms 272, and the lock mechanisms 274 can clamp the front bumper FB without removal of the front bumper FB.

Description of 3-axis Floating Device 268

In general, since the front bumper FB is attached to the vehicle body B in the final stage up to which errors in the manufacture of the vehicle body have been accumulated, the attaching position defined on the drawing, and an actual attaching position of the front bumper FB are different in the three axial directions. For this reason, in this embodiment, the above-mentioned gripping mechanism 270, chucking mechanisms 272, and lock mechanisms 274 are equipped on the frame 264 through the 3-axis floating device 268 so as to allow displacements in the three axial directions.

In this embodiment, as the three axial directions, with reference to the central line extending in the back-and-forth direction of the vehicle body, a direction along the widthwise direction of the vehicle body is defined as a BL direction, a direction along the central line is defined as a TL direction, and a direction along the direction of height is defined as a WL direction. More specifically, the 3-axis floating device 268 is constituted by a BL floating mechanism 276 for independently allowing a displacement of the clamp device 260 in the BL direction, a TL floating mechanism 278 for independently allowing a displacement of the clamp device 260 in the TL direction, and a WL floating mechanism 278 for independently allowing a displacement of the clamp device 260 in the WL direction.

In this embodiment, since the displacement in the BL direction must be sufficiently allowed, and the displacement in the WL direction is small, as shown in FIG. 14, the WL floating mechanism 280 is equipped immediately below the frame 264. The TL floating mechanism 278 is equipped to be able to be displaced in the WL direction by the WL floating mechanism 280. The BL floating mechanism 276 is equipped to be able to be displaced in the TL direction by the TL floating mechanism 278. The clamp device 260 is equipped to be able to be displaced in the BL direction by the BL floating mechanism 276.

WL Floating Mechanism 280

More specifically, as shown in FIG. 14, downward projecting WL arms 282a and 282b constituting the WL floating mechanism 280 and each having a substantially L shape (see FIG. 15) stand upright on the lower surfaces at the two ends of the frame 264. Pairs of slide bushings 284a and 284b; and 284c and 284d are respectively attached to the outer side surfaces of these WL arms 282a and 282b to be separated in the WL direction (the vertical direction in FIG. 14). WL floating plates 288a and 288b are respectively supported on these slide bushings 284a and 284b; and 284c and 284d to be movable in the WL direction while guide rails 286a and 286b are respectively fitted in the slide bushings 284a and 284b; and 284c; and 284d.

Figure 15:
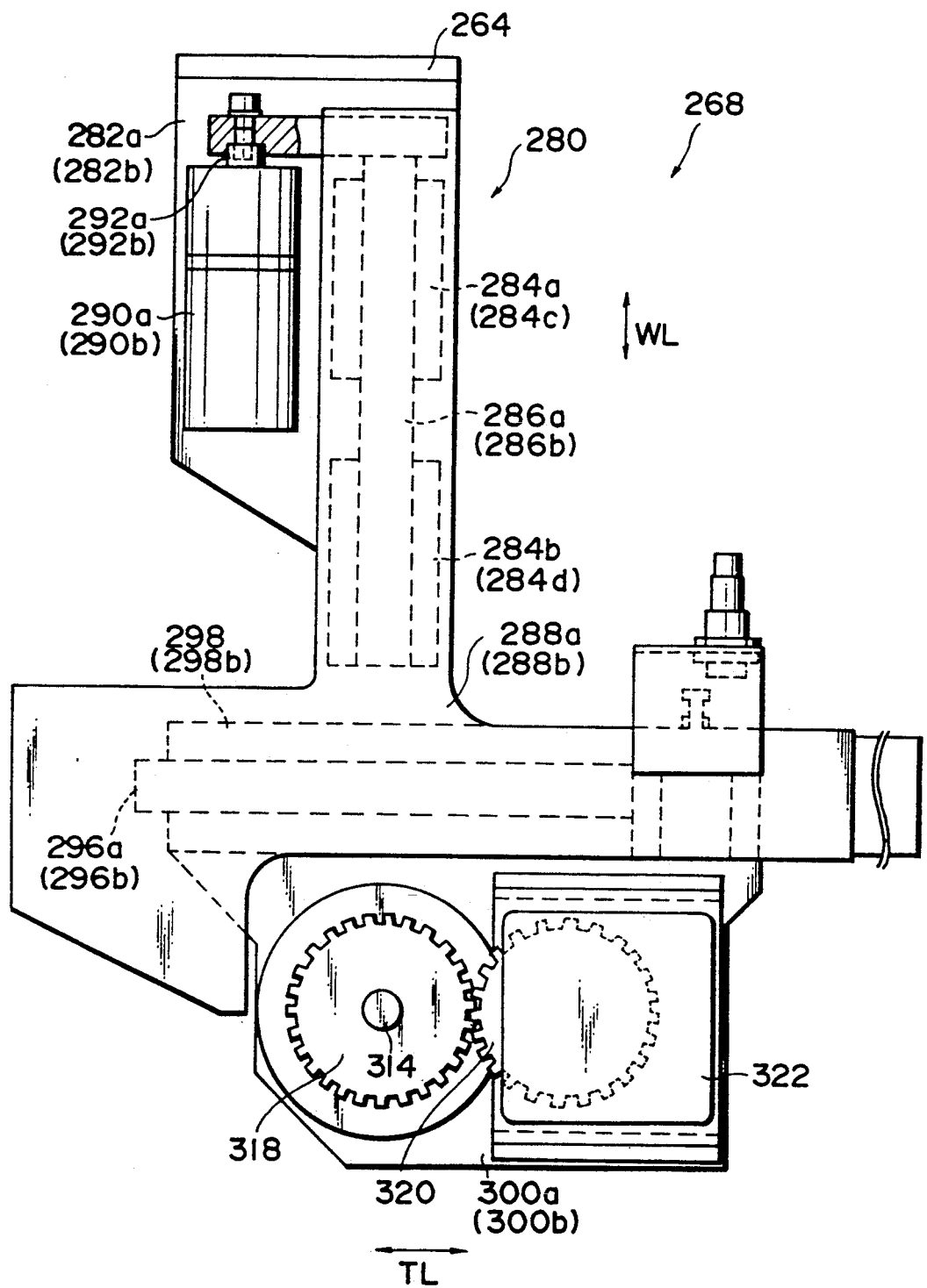
FIG. 15 is a side view showing the clamp device shown in FIG. 14.

As shown in FIG. 15, WL floating cylinders 290a and 290b are respectively attached to these WL arms 282a and 282b. WL piston rods 292a and 292b are respectively arranged in the WL floating cylinders 290a and 290b to be able to project upward in FIG. 15. The upper ends of the WL piston rods 292a and 292b are respectively coupled to the WL floating plates 288a and 288b. When a WL lock mode is set, the WL floating cylinders 290a and 290b lock the corresponding WL piston rods 292a and 292b to fix their projecting positions. When a WL floating mode is set, the WL floating cylinders 290a and 290b allow displacements of the WL floating plates 288a and 288b in the WL direction while supporting weights acting on themselves and WL floating plates 288a and 288b.

Stopper members 294a and 294b (FIG. 14) for preventing the corresponding WL floating plates 288a and 288b from downward removal are attached to the lower ends of the WL arms 282a and 282b.

In this embodiment, the WL floating mechanism 280 can independently float the WL floating plates 288a and 288b at the two ends in the BL direction to be able to be displaced in the WL direction.

TL Floating Mechanism 278

As shown in FIG. 14, guide rails 296a and 296b constituting the TL floating mechanism 278 and extending in the TL direction are respectively attached to the inner side surfaces of the lower ends of the WL floating plates 288a and 288b. TL floating plates 300a and 300b are respectively supported by these guide rails 296a and 296b through slide bushings 298a and 298b to be movable in the TL direction.

Figure 16:
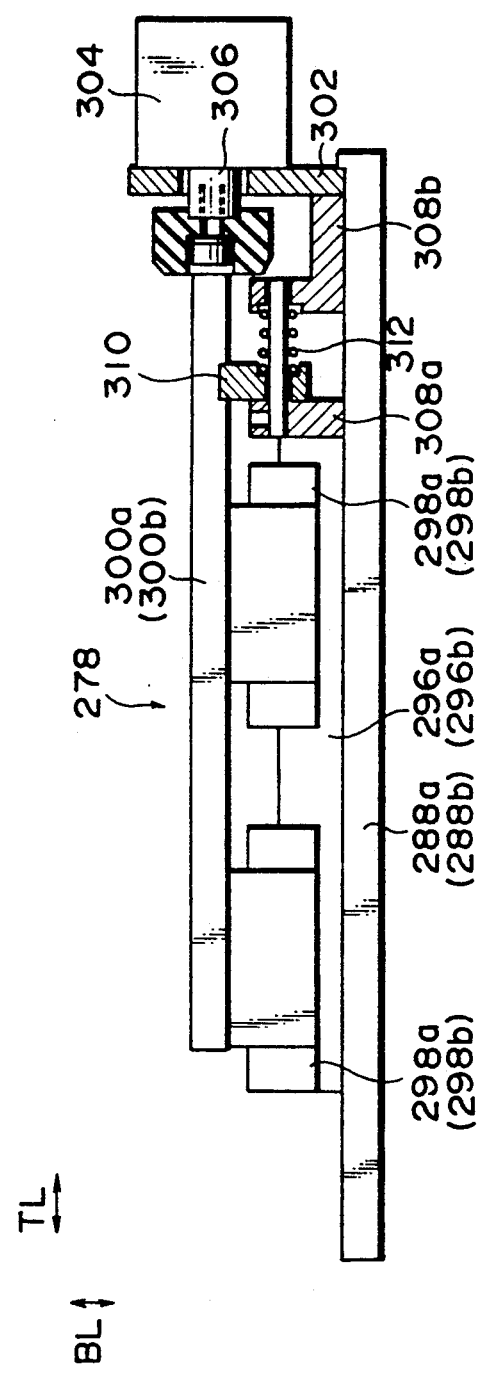
FIG. 16 is a side view showing a TL floating mechanism of a 3-axis floating device equipped in the clamp device.

As shown in FIG. 16, TL floating cylinders 304 are attached through stays 302 to the front ends along the TL direction of the lower ends of the WL floating plates 288a and 288b (the right ends in FIG. 16, in other words, the end portions opposite to the attached side of the front bumper FB). A TL piston rod 306 is arranged in each TL floating cylinder 304 to be retractable to the right in FIG. 16. The left end (FIG. 16) of each TL piston rod is fixed to the right end (FIG. 16) of a corresponding one of the TL floating plates 300a and 300b.

A pair of attaching pieces 308a and 308b are respectively attached to the lower end of each of the WL floating plates 288a and 288b to be separated from each other in the TL direction so as to project toward a corresponding one of the TL floating plates 300a and 300b. A pressing piece 310 is attached to each of the TL floating plates 300a and 300b to be interposed between the corresponding two attaching pieces 308a and 308b. A coil spring 312 is interposed between the pressing piece 310 and the front attaching piece 308b in the TL direction (i.e., the right one in FIG. 16). The coil spring 312 biases the corresponding pressing piece 310 to be displaced backward (i.e., to the left in FIG. 16) in the TL direction. As a result, when the corresponding TL floating cylinder 304 does not generate any retracting force, the pressing segment 310 is in contact with the front attaching segment 308a, and its position is elastically held. In other words, in this contact state, a lock state in the TL direction can be attained.

When a TL floating mode is set, each TL floating cylinder 304 generates a retracting force for retracting the corresponding TL piston rod 306 inwardly. As a result, the TL floating plates 300a and 300b are retracted forward against the biasing forces of the corresponding coil springs 312. In this manner, the displacements in the TL direction of the TL floating plates 300a and 300b are allowed. When a TL lock mode is set, the retracting force of each TL floating cylinder 304 is released, and as described above, each pressing piece 310 is brought into contact with the front attaching piece 308a by the biasing force of the corresponding coil spring 312. As a result, the position of the pressing piece 310 is locked.

In this embodiment, the TL floating mechanism 278 further floats the TL floating plates 300a and 300b to be able to be independently displaced in the TL direction, while the WL floating state is realized by the WL floating mechanism 280.

BL Floating Mechanism 276

As shown in FIG. 14, two ends of a BL floating shaft 314 extending across the TL floating plates 300a and 300b in the BL direction are axially supported by the lower ends of the TL floating plates 300a and 300b through bearings 316a and 316b to be pivotal about a BL axis and to be slidable along the BL axis. The BL floating shaft 314 serves as an attaching shaft for the gripping mechanism 270 (to be described in detail later). The right end (FIG. 14) of the BL floating shaft 314 projects outwardly to extend through the corresponding bearing 316a, and a driven gear 318 comprising a bevel gear is coaxially and integrally fixed to this projecting end. As also shown in FIG. 15, a driving gear 320 comprising a bevel gear and meshing with the driven gear 318 is rotatably attached to the outer side surface of the right TL floating plate 300a (FIG. 14). The driving gear 320 is connected to and rotated by a driving motor 322 similarly attached to the outer side surface of the TL floating plate 300a, and serving as a rotation driving source of the gripping mechanism 270 (to be described later).

More specifically, the BL floating mechanism 276 floats the BL floating shaft 314 to be able to be displaced in the BL direction through the meshing state of the bevel gears 318 and 320 while maintaining this meshing state, in a state wherein the WL floating state in the WL direction is attained through the WL floating mechanism 280, and the TL floating state in the TL direction is maintained through the TL floating mechanism 278.

Figure 17:
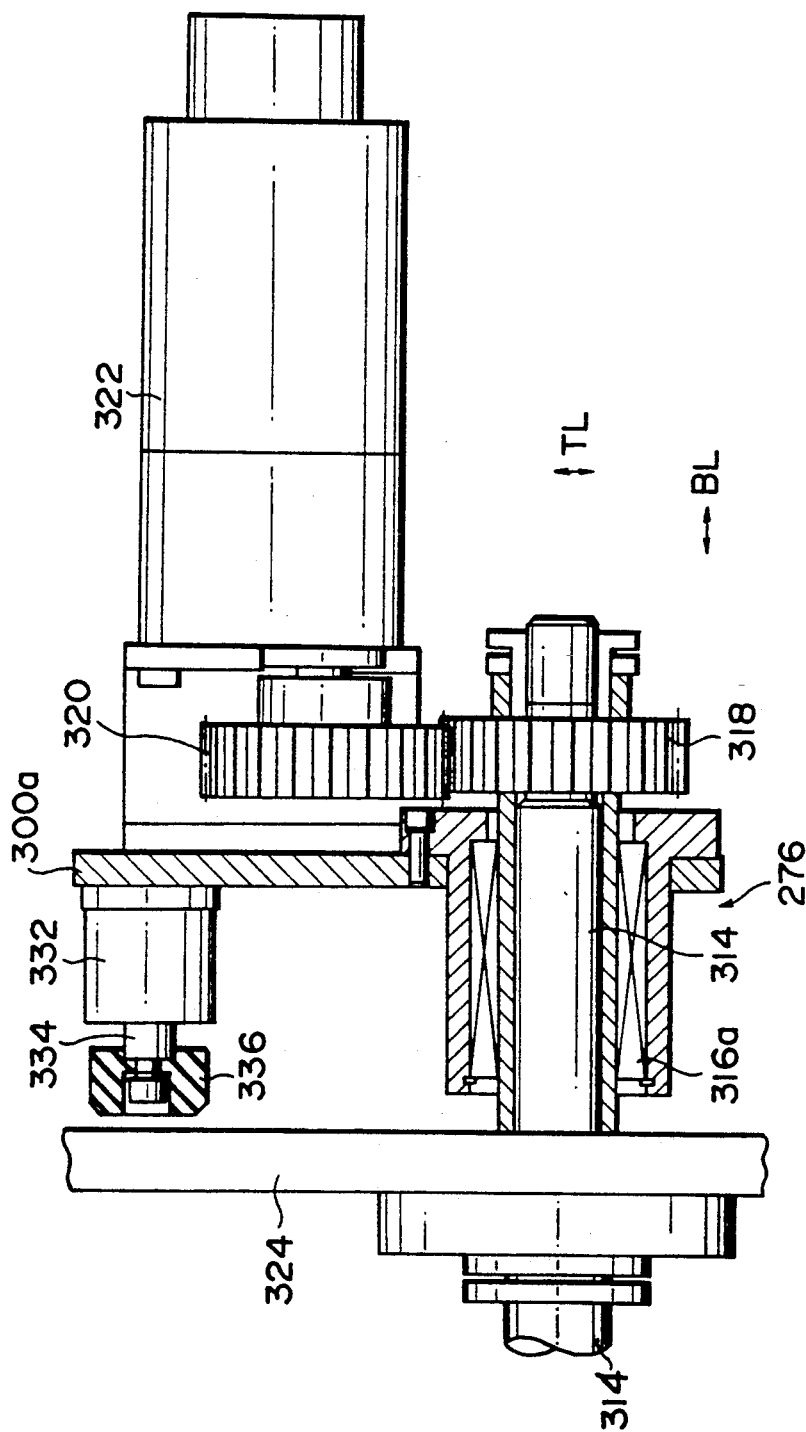
FIG. 17 is a front view showing the principal part of a BL floating mechanism of the 3-axis floating device equipped in the clamp device.

Although the arrangement of the gripping mechanism 270 will be described in detail later, as shown in FIG. 14, the gripping mechanism 270 comprises four, i.e., first to fourth rotary plates 324, 326, 328, and 330, which are coaxially arranged on the BL floating shaft 314 to be rotated integrally with the shaft 314. As shown in FIG. 17, BL lock air cylinders 332 are arranged on portions of the TL floating plates 300a and 300b, opposing the first and fourth rotary plates 324 and 330 located at the two ends. These air cylinders 322 comprise piston rods 334, which can project toward the corresponding first and fourth rotary plates 324 and 330. Lock members 336 each formed of an elastic member are attached to the distal ends of these piston rods 334. The lock members 336 oppose the side surfaces of the corresponding rotary plates 324 and 330 with small gaps, and inhibit the displacement of the BL floating shaft 314 in the BL direction within the range of the small gaps, i.e., lock the BL floating shaft 314.

More specifically, when a BL lock mode is set in the BL floating mechanism 276, the BL lock air cylinders 332 are driven to project the corresponding piston rods 334, so that the lock members 336 oppose the corresponding rotary plates 324 and 330 with a predetermined gaps, i.e., to be separated by a distance of 0.2 mm. As a result, the floating state of the BL floating shaft 314 is locked at an arbitrary position within a range of 0.4 mm as a total of the right and left gaps in the BL direction. On the other hand, when a BL floating mode is set, the BL lock cylinders 322 retract the corresponding piston rods 334 inwardly, and the lock members 336 are separated from the corresponding rotary plates 324 and 330 in the BL direction. As a result, the BL floating shaft 314 can be displaced in the BL direction, i.e., is set in a floating state.

In the 3-axis floating device 268, the floating modes of the floating mechanisms 276, 278, and 280 for the respective axes are set only immediately before the clamp device 260 grips the front bumper FB located at the supply position Pl, i.e., immediately before the gripped front bumper FB is mounted on the front portion of the vehicle body B. Otherwise, the lock modes are set. In other words, during the convey operation of the front bumper FB by the first robot 102, the 3-axis floating device 268 locks the floating state to rigidly grip the front bumper FB, so that the front bumper is not loosened during the convey operation.

Description of Gripping Mechanism 270

The arrangement of the gripping mechanism 270, supported by the above-mentioned 3-axis floating device 268, for holding the outer surface of the front bumper FB will be described in detail below.

The gripping mechanism 270 comprises the four rotary plates 324, 326, 328, and 330 attached to the BL floating shaft 314 serving as the attaching shaft, as described above. As shown in FIG. 14, these rotary plates 324, 326, 328, and 330 are classified into the pair of right and left rotary plates 324 and 330 (FIG. 14) arranged at the outer side in correspondence with the large-size front bumper FB1, and the pair of right and left rotary plates 326 and 328 (FIG. 14) arranged at the inner side in correspondence with the small-size front bumper FB2 to have the central point of the BL floating shaft 314 in the BL direction as a symmetrical point.

Gripping Jig

Figure 19:
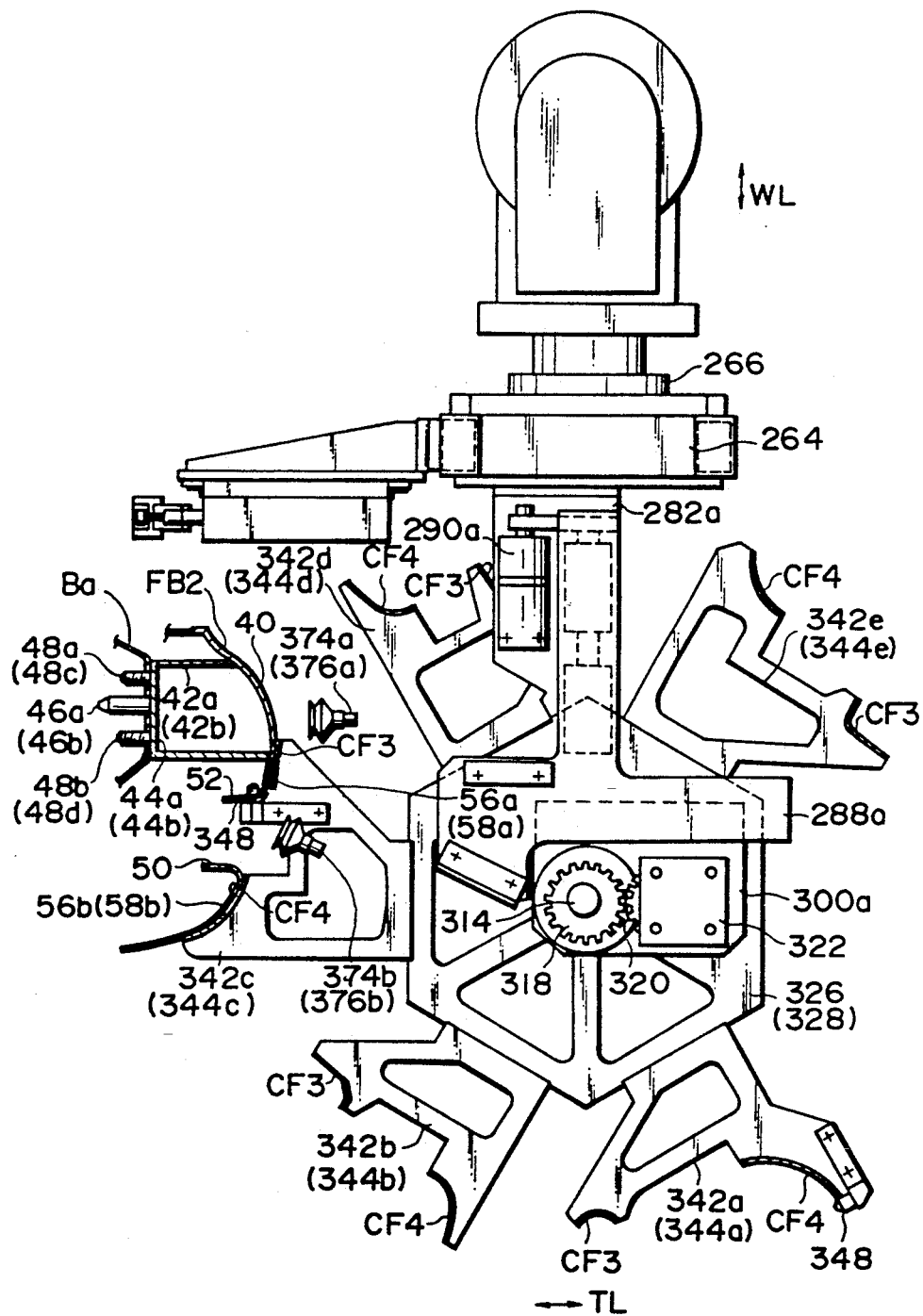
FIG. 19 is a side view showing an arrangement for gripping a small-size front bumper of the gripping mechanism equipped in the clamp device.

In this embodiment, each of the rotary plates 324, 326, 328, and 330 is formed into a regular hexagonal shape, and these plates are fixed while the BL floating shaft 314 extends through their central portions. Gripping jigs for gripping six different surfaces to be gripped of the large-size front bumpers FB1 can be attached to the six sides of each of the two outer rotary plates 324 and 330. In this embodiment, five different gripping jigs 340a through 340e, and 346a through 346e are respectively attached to the sides of the rotary plates 324 and 330. On the other hand, as shown in FIG. 19, gripping jigs for gripping six different surfaces to be gripped of the small-size front bumpers FB2 can be attached to the six sides of each of the two inner rotary plates 326 and 328. In this embodiment, five different gripping jigs 324a through 324e, and 344a through 344e are respectively attached to the rotary plates 326 and 328.

As shown in FIG. 14, the gripping jigs 342a through 342e an 344a through 344e of the two inner rotary plates 326 and 328 are formed to have sizes smaller than those of the gripping jigs 340a through 340e and 346a through 346e of the two outer rotary plates 324 and 330. As a result, when one of each of the outer gripping jigs 340a through 340e and 346a through 346e grips the large-size front bumper FB1, this gripping state is not disturbed by the inner gripping jigs 342a through 342e and 344a through 344e. The outer gripping jigs 340a through 340e and 346a through 346e are arranged at positions so as not to engage with the outer surface of the small-size front bumper FB2. As a result, when one of each of the inner gripping jigs 342a through 342e and 344a through 344e grips the small-size front bumper FB2, this gripping state is not disturbed by the outer gripping jigs 340a through 340e and 346a through 346e.

The gripping jigs 340a through 340e and 346a through 346e attached to the outer rotary plates 324 and 330 are arranged, so that a pair of right and left jigs located at the same rotational position grip the corresponding surfaces to be gripped of the large-size front bumper FB1 in cooperation with each other. The gripping jigs 342a through 342e and 344a through 344e attached to the inner rotary plates 326 and 328 are arranged, so that a pair of right and left jigs located at the same rotational position grip the corresponding surfaces to be gripped of the small-size front bumper FB2 in cooperation with each other.

The above-mentioned rotary plates 324, 326, 328, and 330 are rotated upon rotation of the BL floating shaft 314. In this case, each rotary plate is arranged, so that the gripping jig rotated to the left horizontal position (FIG. 18) is located at a gripping position for gripping the surface to be gripped of the corresponding front bumper FB. The above-mentioned driving motor 322 as the rotation driving source rotates the BL floating shaft 314 through the meshing state between the driving gear 320 and the driven gear 318, is index-driven so that the gripping jigs 340a through 340e, 342a through 342e, 344a through 344e, and 346a through 346e can be stopped at the gripping positions.

Figure 18:
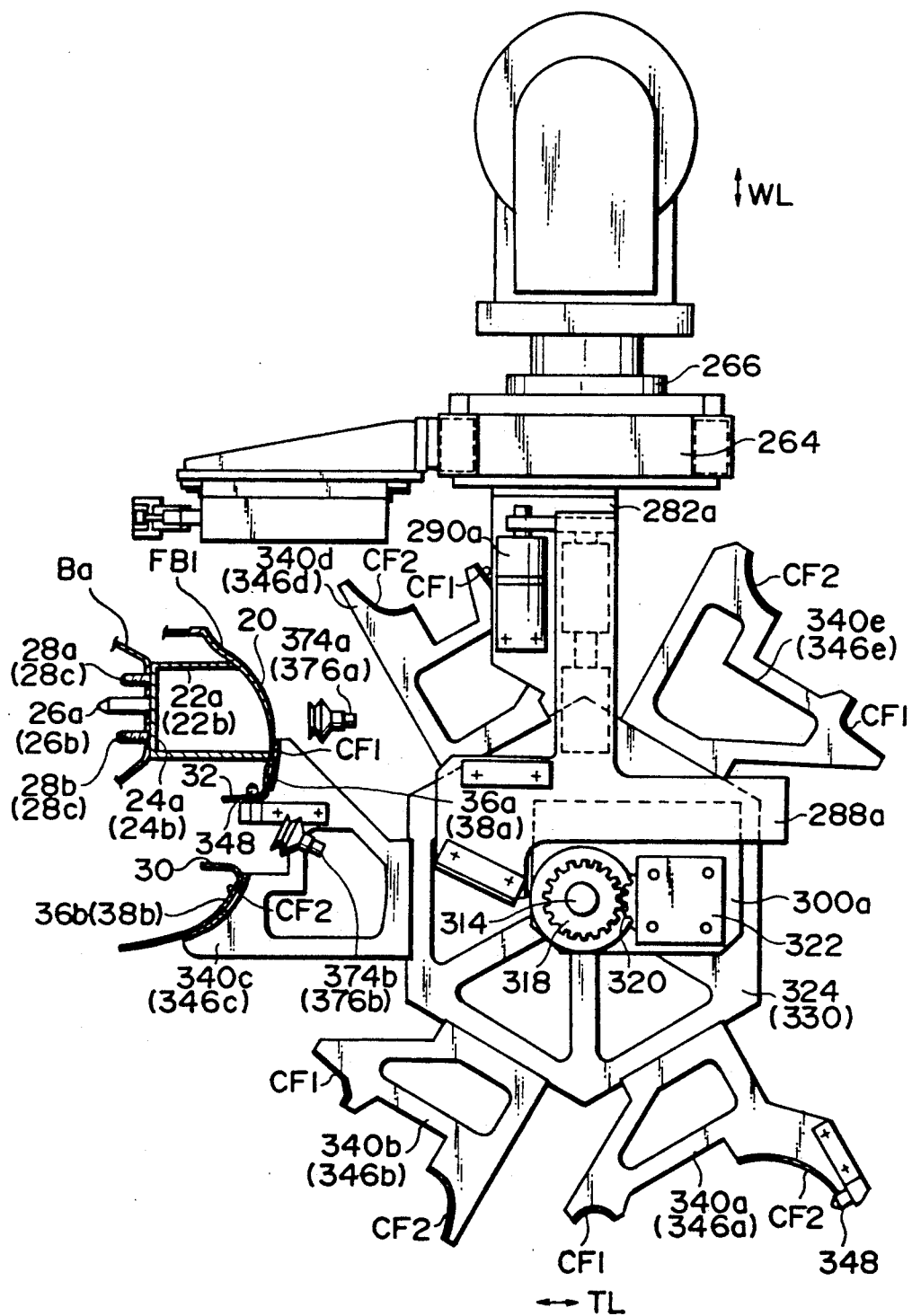
FIG. 18 is a side view showing an arrangement for gripping a large-size front bumper of a gripping mechanism equipped in the clamp device.

More specifically, each of the gripping jigs 340a through 340e, 342a through 342e, 344a through 344e, and 346a through 346e has a pair of gripping surfaces CF1 and CF2; or CF3 and CF4 according to the shape of the surface to be gripped so as to be able to independently grip both the upper and lower surfaces to be gripped above and below the opening 30 (50) of the outer surface of the corresponding front bumper FB, as shown in FIGS. 18 and 19. That is, each of the gripping jigs 340a through 340e attached to the outer right rotary plate 324 in FIG. 14 comprises a pair of upper and lower gripping surfaces CF1 and CF2 for gripping the upper and lower right surfaces 36a and 36b to be gripped of the large-size front bumper FB1 according to the outer surface shape of the bumper. Each of the gripping jigs 346a through 346e attached to the outer left rotary plate 324 (FIG. 14) comprises a pair of upper and lower gripping surfaces CF1 and CF2 for gripping the upper and lower left surfaces 38a and 38b to be gripped of the large-size front bumper FB1 according to the outer surface shape of the bumper.

Each of the gripping jigs 342a through 342e attached to the inner right rotary plate 326 (FIG. 14) comprises a pair of upper and lower gripping surfaces CF3 and CF4 for gripping the upper and lower right surfaces 56a and 56b to be gripped of the small-size front bumper FB2 according to the outer surface shape of the bumper. Each of the gripping jigs 344a through 344e attached to the inner left rotary plate 328 (FIG. 14) comprises a pair of upper and lower gripping surfaces CF3 and CF4 for gripping the upper and lower left surfaces 58a and 58b to be gripped of the small-size front bumper FB2 according to the outer surface shape of the bumper.

In this manner, in this embodiment, when the BL floating shaft 314 is rotated, the gripping jigs 340a to 340e, 342a to 342e, 344a to 344e, and 346a to 346e comprising the gripping surfaces CF1 and CF2; and CF3 and CF4 suitable for gripping the corresponding front bumper FB can be selectively brought to the gripping positions.

Positioning Pin 348

As shown in FIGS. 18 and 19, the gripping jigs 340a through 340e, 342a through 342e, 344a through 344e, and 346a through 346e respectively have positioning pins 348, so that the corresponding surfaces 36a; 36b; 38a; 38b; 56a, 56b; 58a; and 58b to be gripped can be in tight contact with their gripping surfaces CF1 (CF3) and CF2 (CF4) in a predetermined state. The positioning pins 348 are attached to the corresponding gripping jigs 340a through 340e, 342a through 342e, 344a through 344e, and 346a through 346e to project upward at the gripping positions. More specifically, the positioning pins 348 are inserted, from below, into the right and left positioning holes 34b and 34a; or 54b and 54a, which are independently formed in the corresponding front bumper FB according to its size, so that the relative positions between the front bumper FB and the corresponding gripping jigs 340a to 340e, 342a to 342e, 344a to 344e, and 346a through 346e can be accurately aligned.

More specifically, the positioning pins 348, respectively attached to the gripping jigs 340a through 340e; and 346a through 346e provided to the outer right and left rotary plates 324 and 330, are set to be inserted, from below, into the positioning holes 34a and 34b formed in the right and left portions of the bumper main body 20 of the large-size front bumper FB1. On the other hand, the positioning pins 348, respectively attached to the gripping jigs 342a through 342e; and 344a through 344e provided to the inner right and left rotary plates 326 and 328, are set to be inserted, from below, into the positioning holes 56a and 56b formed in the right and left portions of the bumper main body 40 of the small-size front bumper FB2.

Index Position Detection Mechanism 352

Figure 20:
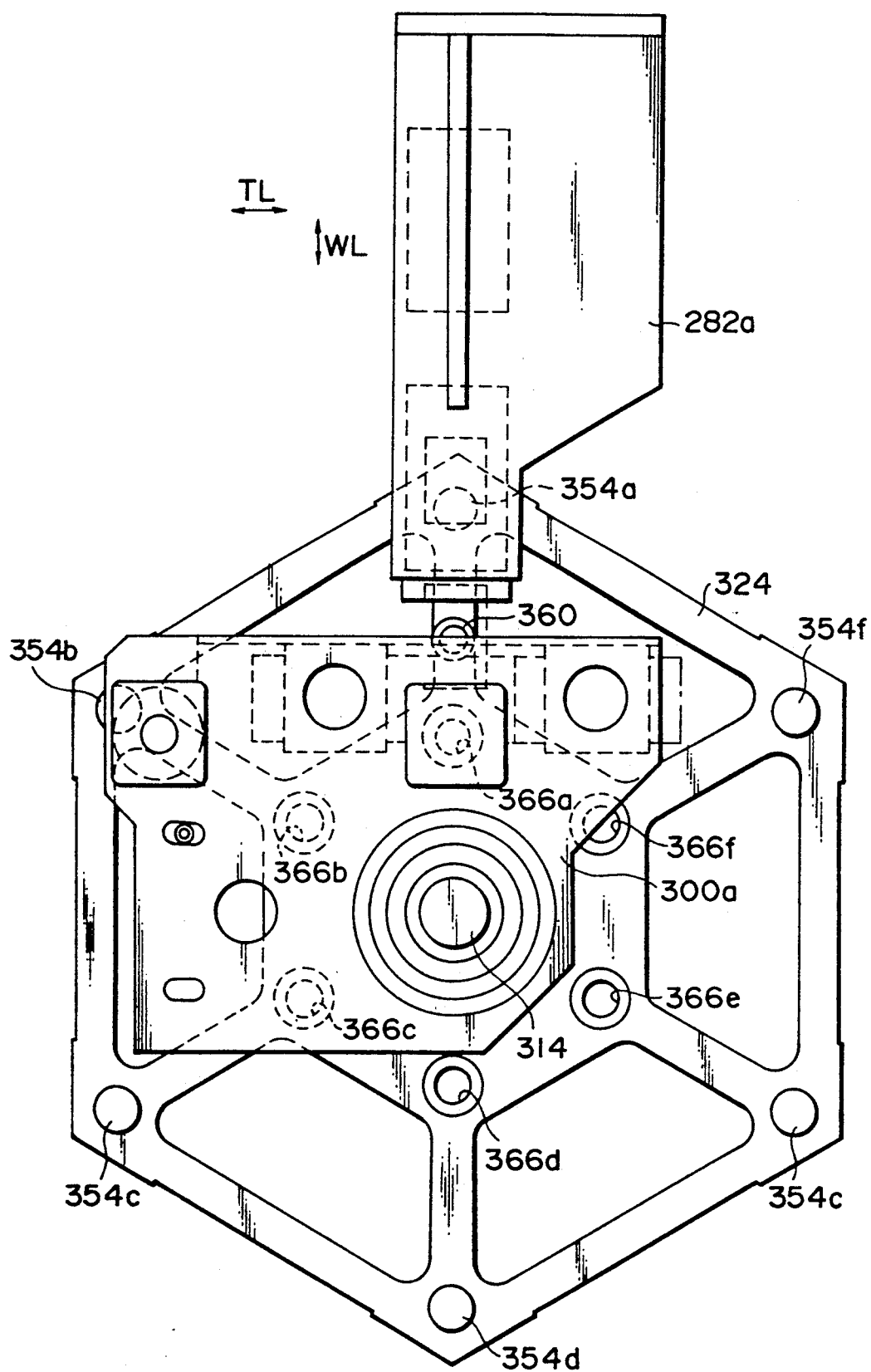
FIG. 20 is a side view for explaining a position detection mechanism and a lock mechanism in the gripping mechanism shown in FIG. 18.

In order to index-drive the BL floating shaft 314, the gripping mechanism 270 comprises an index position detection mechanism 352 for detecting the index stop position of the shaft 314. The index position detection mechanism 352 has detection dogs 354a through 354f, which are attached to positions, corresponding to the vertices of the regular hexagon, of the outer side surface of the right rotary plate 324 in FIG. 14, as shown in FIG. 20, for defining the index stop positions, and a rotational position sensor 356, comprising a proximity sensor, which is attached to the inner surface of the WL arm 282a opposing the rotary plate 324, as shown in FIG. 20, and is turned on in the vicinity of each of the detection dogs 354a through 354f of the rotary plate 324 stopped at the index stop position. The rotational position sensor 356 is connected to a control unit (not shown), and the control unit controls to stop the driving operation of the driving motor 322 every time it receives an ON signal from the rotational position sensor 356.

Origin Detection Mechanism 358

An origin detection mechanism 358 for detecting the origin position of the BL floating shaft 314 is arranged, so that the control unit can recognize the gripping jigs located at the corresponding gripping positions. The origin detection mechanism 358 is constituted by an origin detection dog 360, which is attached to the outer side surface of the rotary plate 324 in the vicinity of one detection dog 354a of the six detection dogs 354a through 354f so as to be located on the same radius as the detection dog 354a, as shown in FIG. 20, and an origin sensor 362 comprising an origin sensor 362, which is attached to the inner surface of the WL arm 282a, as shown also in FIG. 21, and is turned on in the vicinity of the origin detection dog 360 when the dog 360 is brought to its uppermost position (i.e., a 0 o'clock position). The origin sensor 362 is connected to the above-mentioned control unit.

Lock Mechanism 364

The gripping mechanism 270 comprises a lock mechanism 364 for locking the stop states of the rotary plates 324, 326, 328, and 330 at their six index positions. The lock mechanism 364 is constituted by six lock holes 366a through 366f, which are formed in the rotary plate 324 to be respectively located on the same radii as the six detection dogs 354a through 354f and on the single circumference, as shown in FIG. 20, a lock cylinder 368 which is attached and fixed to the TL floating plate 300a to oppose a predetermined one (e.g., a lock hole located at the uppermost position) of the lock holes 366a through 366f at the index stop positions, as shown in FIG. 21, and a piston rod 372 which is retractably attached to the lock cylinder 368, and has, as a lock pin 370, a distal end portion to be fitted in one of the lock holes 366a to 366f, which is brought to the uppermost position.

Figure 21:
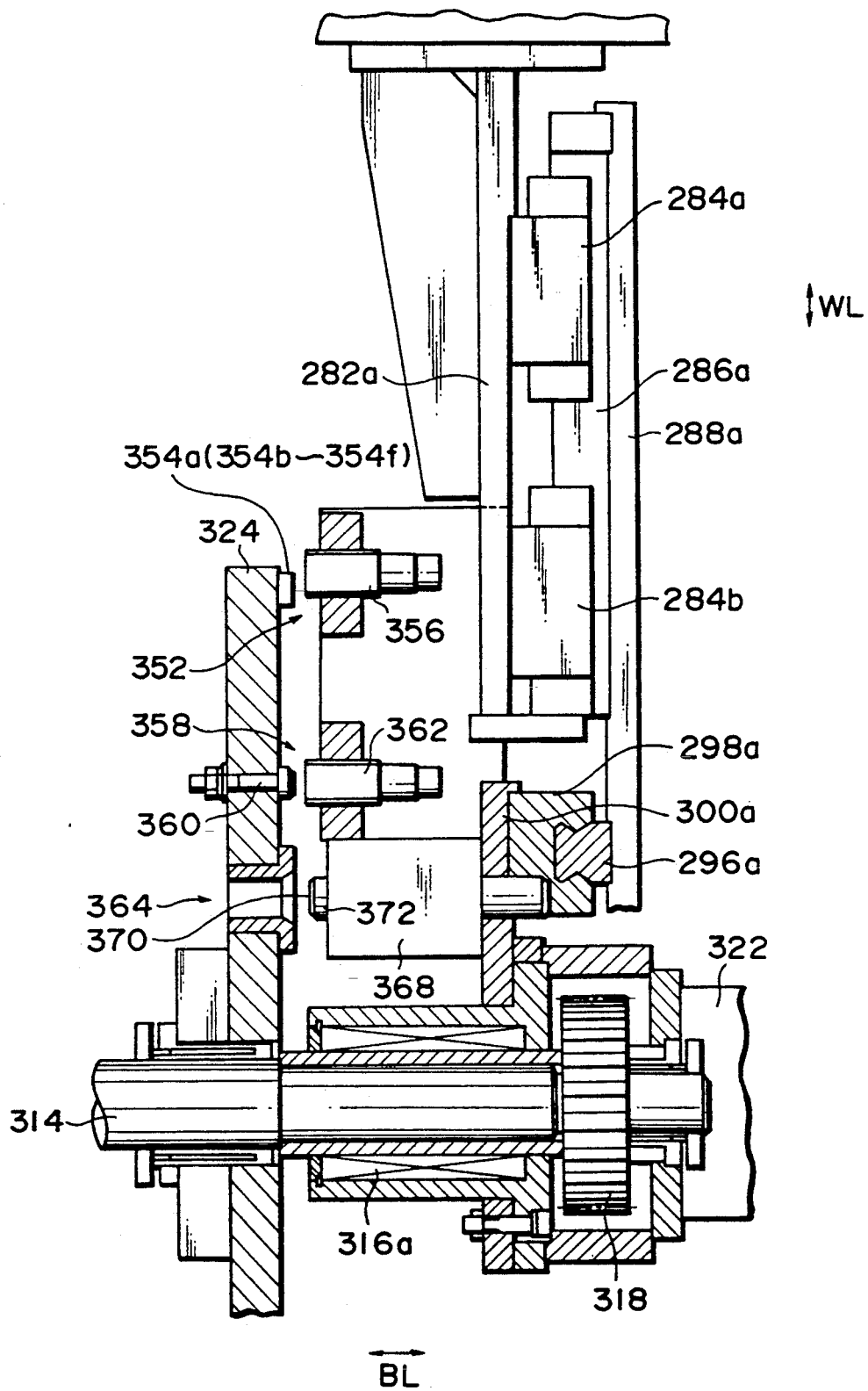
FIG. 21 is a front view showing the principal part of the position detection mechanism and the lock mechanism in the gripping mechanism shown in FIG. 18.

As shown in FIG. 21, a tapered portion is formed on the outer peripheral edge of each of the lock holes 366a through 366f, and a tapered portion is also formed on the outer peripheral surface of the distal end portion 370 of the piston rod 372. In this manner, even when the rotational stop position of the rotary plate 324 is slightly shifted, since the tapered portion of one of the lock holes 366a through 366f is engaged with the tapered portion of the distal end portion 370 of the piston rod 372, the distal end portion 370 of the piston rod 372 can be fitted in the corresponding one of the lock holes 366a through 366f while the shift is corrected, and the stop states of the rotary plates 324, 326, 328, and 330 are locked while they are accurately stopped at the six index positions.

Description of Chucking Mechanism 272

The chucking mechanisms 272 for chucking the outer surface of the front bumper FB gripped by the above-mentioned gripping mechanism 270, and holding the gripping state of the gripping mechanism 270 will be described below.

The chucking mechanisms 272 comprise pairs of upper and lower chucking pads 374a and 374b; and 376a and 376b, which are respectively located outside the pair of right and left outer rotary plates 324 and 330, as shown in FIG. 14. The chucking pads 374a and 374b; and 376a and 376b are attached to be retractable along the TL direction by air cylinder mechanisms (not shown), and are retracted in the corresponding air cylinder mechanism in a standby state, so that the pads stand by at positions separated from the outer surface of the front bumper FB to be chucked. The air cylinder mechanisms corresponding to the upper chucking pads 374a and 376a are respectively attached to the inner side surfaces of the right and left WL arms 282a and 282b, and the air cylinder mechanisms corresponding to the lower chucking pads 374b and 376b are respectively attached to the inner side surfaces of the right and left TL floating plates 300a and 300b.

When the large-size front bumper FB1 is to be chucked, the right and left upper chucking pads 374a and 376a project backward along the TL direction upon driving of the corresponding air cylinder mechanisms, and are brought into contact with the outer surface of the bumper main body 20 of the large-size front bumper FB1, thereby chucking the bumper FB1 on the basis of a negative pressure from a chucking source (not shown). When the small-size front bumper FB2 is to be chucked, the right and left lower chucking pads 374b and 376b project backward along the TL direction upon driving of the corresponding air cylinder mechanisms, and are brought into contact with the outer surface of the bumper main body 40 of the small-size front bumper FB2, thereby chucking the bumper FB2 on the basis of a negative pressure from a chucking source (not shown).

Description of Lock Mechanism 274

The lock mechanisms 274 for locking the outer surface of the front bumper FB, which is gripped by the above-mentioned gripping mechanism 270, and is chucked by the chucking mechanisms 272, and guaranteeing the clamp state by the clamp device 260, will be described below.

Figure 22:
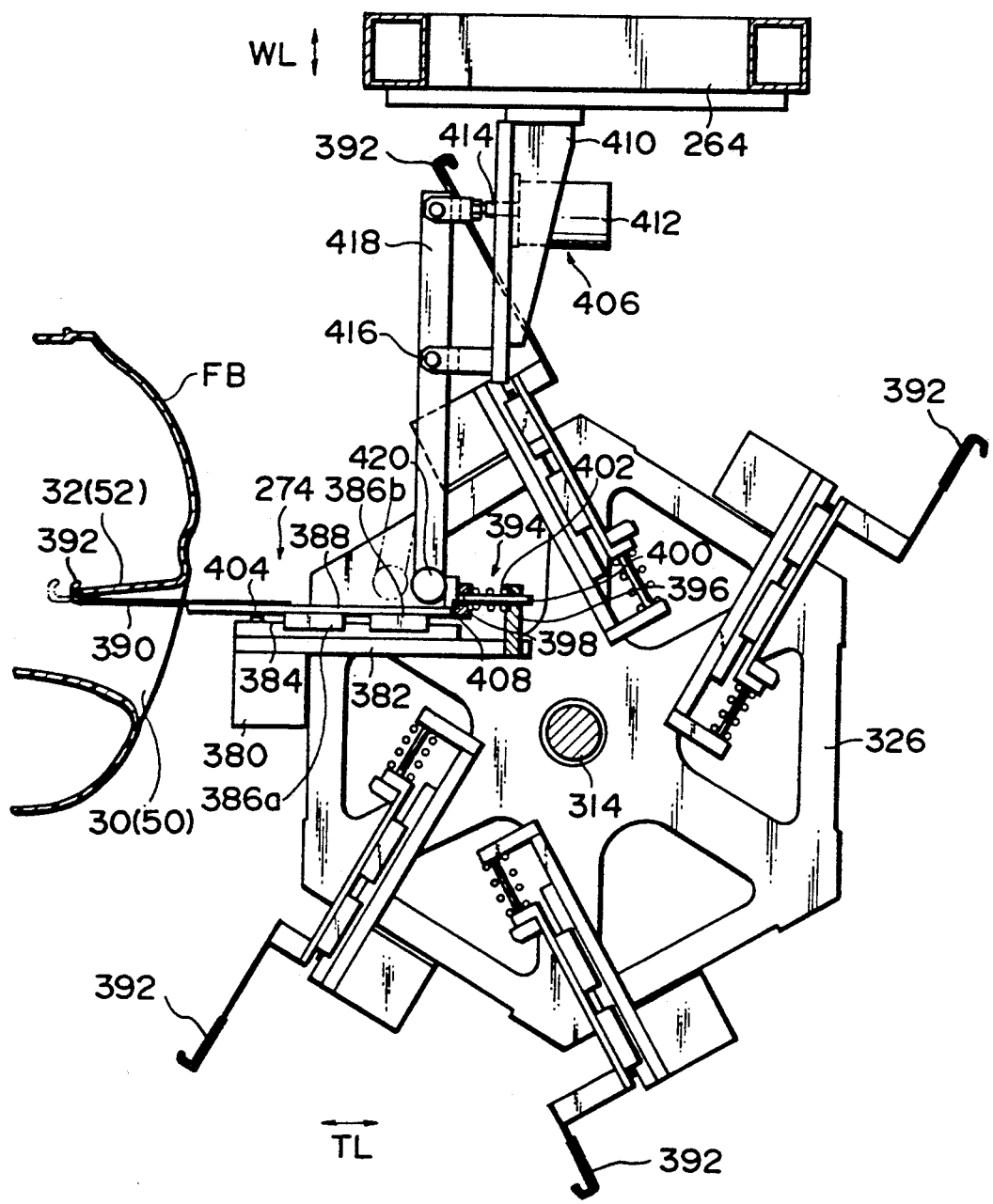
FIG. 22 is a side view showing the arrangement of a lock mechanism equipped in the clamp device.
Figure 23:
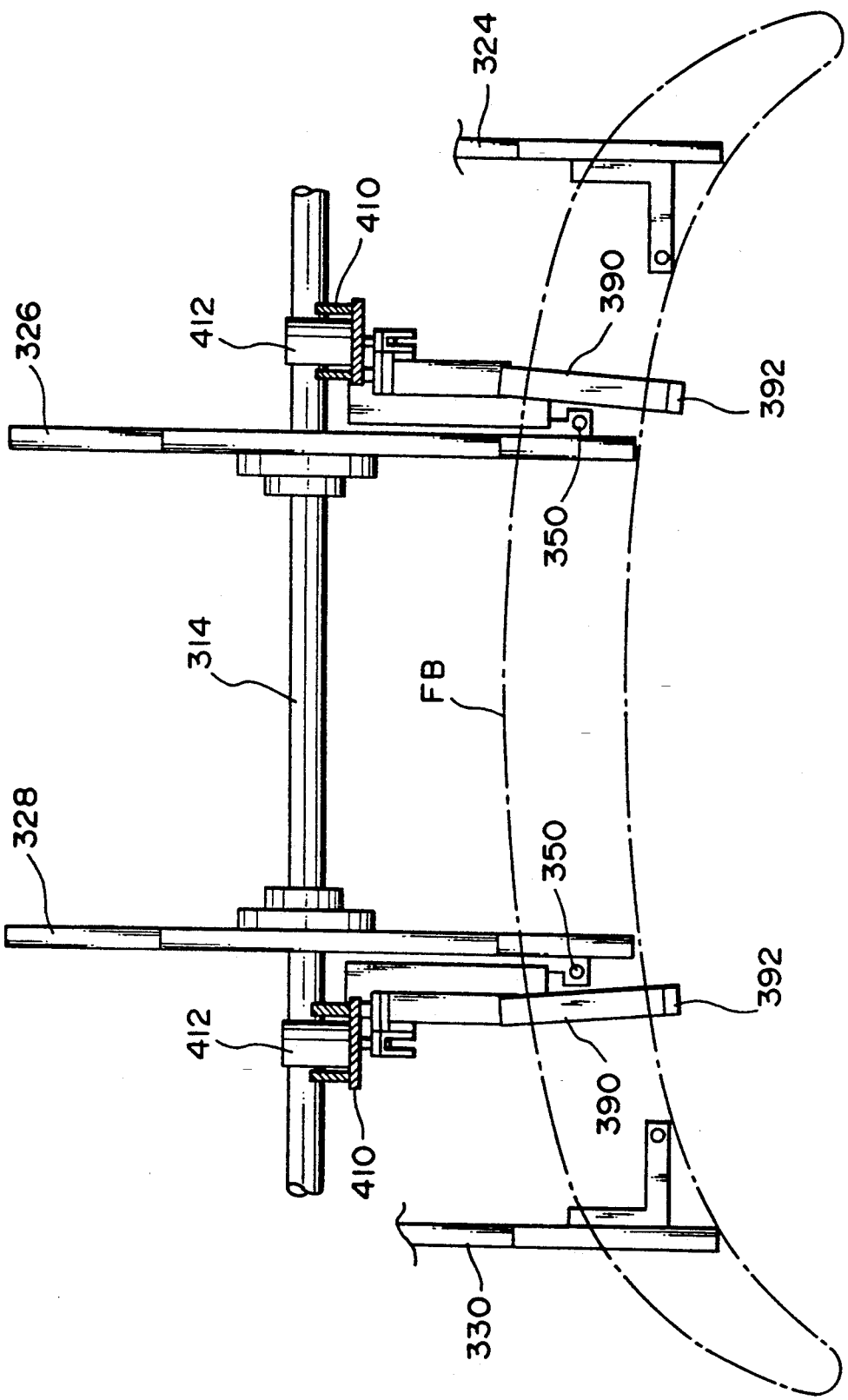
FIG. 23 is a plan view of the lock mechanism shown in FIG. 22.
Figure 24:
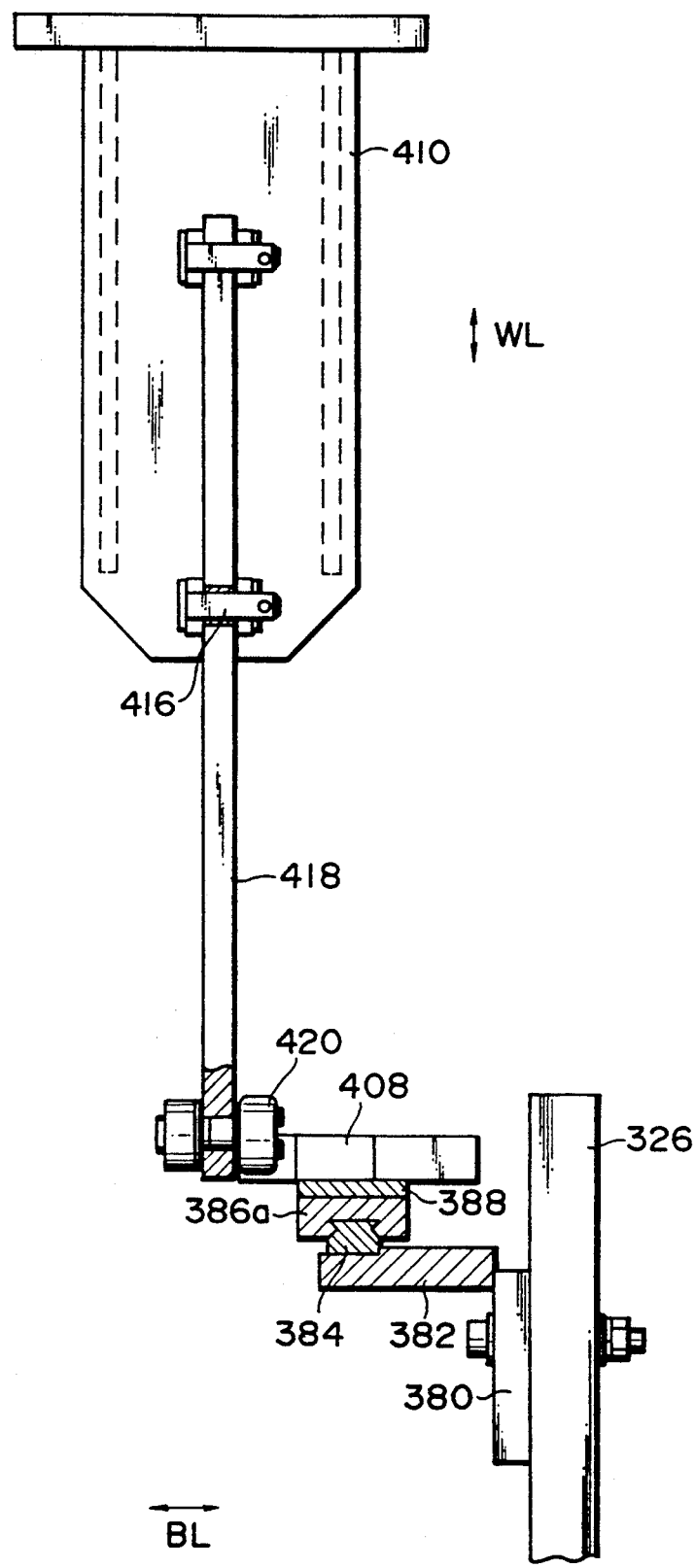
FIG. 24 is a front view showing the arrangement of a deviation mechanism of the lock mechanism shown in FIG. 22.

The lock mechanisms 274 are respectively arranged on the outer side surfaces of the right and left inner rotary plates 326 and 328, as shown in FIG. 14. Each lock mechanism 274 is representatively illustrated in FIG. 14 in correspondence with the gripping jig 342a (344a) located at the gripping position. However, in practice, as shown in FIG. 22, the lock mechanisms 274 are arranged in correspondence with the gripping jigs 342a through 342e; and 344a to 344e in accordance with the shapes of the front bumper FB to be gripped. Since the lock mechanisms 274 have the same arrangement, the lock mechanism 274 located at the gripping position of the rotary plate 326 in FIG. 22 will be representatively described below.

The lock mechanism 274 comprises a stationary block 380 fixed to the outer end face of the rotary plate 326, a guide block 382 attached to the upper surface of the stationary block 380 and extending in the TL direction, a guide rail 384 extending on the upper surface of the guide block 382 in the TL direction, a movable block 388 which has a pair of guide bushings 386a and 386b slidably fitted on the guide rail 384 on its lower surface and is supported to be slidable in the TL direction, a coupling plate 390 comprising a spring member integrally connected to the rear end (the left end in FIG. 22) of the movable block 388, and a lock piece 392 coupled to the rear end of the coupling plate 390 and having a distal end standing upright to have a forward bent upper end.

Biasing Mechanism 394

Each lock mechanism 274 comprises a biasing mechanism 394 for biasing the movable block 388, i.e., the lock piece 392 backward, i.e., to the left in FIG. 22, so as to elastically hold it at the standby position. As shown in FIG. 22, the biasing mechanism 394 comprises a first receive piece 396 fixed to the front end (i.e., the right end in FIG. 22) of the stationary block 380 in an upright state, a second receive piece 398 fixed to the front end of the movable block 388 in an upright state, a guide shaft 400, extending forward, for projecting the first receive piece 396 forward, and a coil spring 402, interposed between the first and second receive pieces 396 and 398, for biasing the second receive piece 398 backward.

Since the biasing mechanism 394 is arranged as described above, the lock piece 392 is biased backward.

A stopper 404, which contacts the rear guide bushing 386a, is attached to the rear portion of the guide rail 384. When the guide bushing 386a is brought into contact with the stopper 404, the lock piece 392 is brought to the standby position slightly separated backward from the rear edge of the upper extending portion 32 (52) formed in the bumper main body 20 (40) of the corresponding front bumper FB. Since the stopper 404 is arranged in this manner, the movable block 388 biased backward by the biasing mechanism 394 is elastically held at the standby position since the rear guide bushing 386a is brought into contact with the stopper 404.

Deviation Mechanism 406

Each lock mechanism 274 comprises a deviation mechanism 406 for deviating forward the lock piece 392 corresponding to one of the gripping jigs 342a through 342e, which is brought to the gripping position, from the above-mentioned standby position by engaging the lock piece 392 with the rear edge of the extending portion 32 (52).

The deviation mechanism 406 is constituted by an engaging block 408, attached to the rear side of the above-mentioned second receive piece 398 and projecting to the left from the stationary block 380 or the movable block 388 in the BL direction, an air cylinder 412 fixed to the middle portion of a downward projecting stay 410 standing upright on the lower surface of the frame 264, a piston rod 414 which can project backward from the air cylinder 412, a swing arm 418, the upper end of which is pivotally and axially supported by the piston rod 414, and the middle portion of which is axially supported by the lower end of the stay 410 to be pivotal about a support shaft 416, and a push-in roller 420 which is attached to the lower end of the swing arm 418 and can be engaged with the projecting portion of the engaging block 408.

The air cylinder 412 is set in a standby state when the piston rod 414 is retracted. In this standby state, the push-in roller 420 is held at a position where it is not engaged with the engaging block 408 at the standby position, as indicated by an alternate long and two short dashed line in FIG. 22. Therefore, in the standby state, even when the BL floating shaft 314 is rotated, and the lock mechanism 274 is entirely turned about the BL floating shaft 314, the deviation mechanism 406 does not interfere with the lock mechanism 274 at all, and does not prevent turning of the lock mechanism 274. When the air cylinder 412 is driven to push in the piston rod 414, the swing arm 418 is swung about the support shaft 416 accordingly, and as a result, the push-in roller 420 deviates the engaging block 408 forward from the standby position indicated by the alternate long and two short dashed line. Therefore, the lock piece 392, which is coupled to the engaging block 408 to be moved integrally, is engaged with the front bumper FB from the rear side from the standby position indicated by the alternate along and two short dashed line, as indicated by a solid line, and pulls the bumper FB forward to lock it. More specifically, in the standby state, the lock piece 392 is inserted in the opening 30 (50) formed in the bumper main body 20 (40) of the front bumper FB, and can be engaged forward with the rear edge in FIG. 22 of the upper extending portion 32 (52) in a state wherein the corresponding front bumper FB is gripped by the gripping mechanism 270. When the deviation mechanism 406 is driven, the lock piece 392 is deviated forward from the standby state, and locks the rear edge of the extending portion 32 (52) to pull it forward. In this manner, the clamp state of the front bumper FB, which is gripped by the gripping mechanism 270 and is chucked by the chucking mechanisms 272, can be reliably held by the lock mechanisms 274.

Description of Operation of First Robot 102

The mounting operation of the front bumper FB in the first robot 102 with the above-mentioned arrangement will be described below.

Preparation Operation

Upon the supply operation of the front bumper FB from the receive position P2 to the supply position P1 by the front bumper supply apparatus 106, the clamp operation of the first robot 102 is started. In this clamp operation, the control unit (not shown) checks if the clamp device 260A comprising the gripping jigs 340a through 340e, 342a through 342e, 344a through 344e, and 346a through 346e having the gripping surfaces according to the outer surface shape of the front bumper FB is attached to the distal end of the second horizontal arm 256 through the hand 258. If it is determined that the desired clamp device 260A is attached, the attached clamp device 260A is moved from the standby position to a position opposing the front surface of the front bumper FB stopped at the supply position P1. On the other hand, if it is determined that the desired clamp device 260A is not attached, i.e., that the clamp device 260B is attached, the clamp device 260B is moved from the standby position onto the standby unit 262, and is detached and placed thereon. The clamp device 260A standing by on the standby unit 262 is attached to the distal end of the second horizontal arm 256 through the hand 258, and the attached clamp device 260A is moved to a position opposing the front surface of the front bumper FB stopped at the supply position P1.

When the desired clamp device is the clamp device 260B, the operation opposite to that described above is performed. In the following description, the desired clamp device is representatively denoted by reference numeral 260.

Clamp Operation

While the desired clamp device 260 is moved to the position opposing the front surface of the front bumper FB stopped at the supply position P1, the control unit controls the driving operation of the driving motor 322, so that the gripping jigs 340a through 340e, 342a to 342e, 344a through 344e, and 346a through 346e having the gripping surfaces according to the outer surface shape of the front bumper FB to be clamped are located at the gripping positions. As a result, the gripping jigs 340a through 340e, 342a to 342e, 344a to 344e, and 346a to 346e used in the clamp operation have already been located at the gripping positions when the desired clamp device 260 is stopped at the position opposing the front surface of the front bumper FB to be clamped.

Clamp Operation Inherent to Large-size Front Bumper

Thereafter, the control unit moves the clamp device 260 backward, i.e., toward the front bumper FB located at the supply position P1. As a result, when the front bumper FB to be clamped is the large-size front bumper FB1, the positioning pins 348 attached to the gripping jigs 340a through 340e; and 346a to 346e provided to the right and left outer rotary plates 324 and 330, and brought to the gripping positions are inserted from the below into the positioning holes 34a and 34b formed in the right and left portions of the bumper main body 20, thus accurately regulating the relative position between the clamp device 260 and the front bumper FB1. In addition, the lock pieces 392 of the lock mechanisms 274 provided in units of the rotary plates 324, 326, 328, and 330 are inserted in the opening 30 formed in the front bumper FB1, and are brought to a standby state wherein the lock pieces are located slightly behind the rear end of the extending portion 32.

Upon movement of the clamp device 260 toward the front bumper FB1, the upper and lower gripping surfaces CF1 and CF2 of the gripping jigs, rotated to the gripping positions, of the gripping jigs 340a through 340e and 346a through 346e attached to the pair of right and left outer rotary plates 324 and 330 are brought into contact with and grip the upper and lower surfaces 36a and 36b; and 38a and 38b to be gripped defined on the outer surface of the bumper main body 20, in other words, the outer surface of the large-size front bumper FB1 is gripped by the corresponding ones of the gripping jigs 340a through 340e and 346a to 346e.

Meanwhile, the control unit drives the chucking mechanisms 272 in synchronism with this gripping operation. As a result, the chucking pads 374a and 376a arranged in correspondence with the large-size front bumper FB1 and located at the right and left upper positions are pushed by the corresponding cylinder mechanisms, and chuck the outer surface of the bumper main body 20. In this manner, the gripping state of the front bumper FB1 by the gripping mechanism 270 is assured.

Furthermore, the control unit drives the lock mechanisms 274 in synchronism with this chucking operation so as to start the drive mechanisms 406 attached in correspondence with the pair of right and left outer rotary plates 324 and 330. As a result, the lock pieces 392 in the standby state are moved forward, and lock the extending portion 32, thereby pulling it forward. In this manner, the clamp state of the large-size front bumper FB1 is assured.

Clamp Operation Inherent to Small-size Front Bumper

When the front bumper FB to be clamped is the small-size front bumper FB2, the positioning pins 348 attached to the gripping jigs 342a through 342e; and 344a through 344e provided to the right and left inner rotary plates 326 and 328, and brought to the gripping positions are inserted from the below into the positioning holes 54a and 54b formed in the right and left portions of the bumper main body 40, thus accurately regulating the relative position between the clamp device 260 and the front bumper FB2. In addition, the lock pieces 392 of the lock mechanisms 274 provided in units of the rotary plates 324, 326, 328, and 330 are inserted in the opening 50 formed in the front bumper FB2, and are brought to a standby state wherein the lock pieces are located slightly behind the rear end of the extending portion 52.

Upon movement of the clamp device 260 toward the front bumper FB2, the upper and lower gripping surfaces CF3 and CF4 of the gripping jigs, rotated to the gripping positions, of the gripping jigs 342a through 342e and 344a through 344e attached to the pair of right and left inner rotary plates 326 and 328 are brought into contact with and grip the upper and lower surfaces 56a and 56b; and 58a and 58b defined on the outer surface of the bumper main body 40, in other words, the outer surface of the small-size front bumper FB2 is gripped by the corresponding ones of the gripping jigs 342a through 342e and 344a through 344e.

Meanwhile, the control unit drives the chucking mechanisms 272 in synchronism with this gripping operation. As a result, the chucking pads 374b and 376b arranged in correspondence with the small-size front bumper FB2 and located at the right and left upper positions are pushed by the corresponding cylinder mechanisms, and chuck the outer surface of the bumper main body 40. In this manner, the gripping state of the front bumper FB2 by the gripping mechanism 270 is assured.

Furthermore, the control unit drives the lock mechanisms 274 in synchronism with this chucking operation so as to start the drive mechanisms 406 attached in correspondence with the pair of right and left inner rotary plates 326 and 328. As a result, the lock pieces 392 in the standby state are moved forward, and lock the extending portion 52, thereby pulling it forward. In this manner, the clamp state of the small-size front bumper FB2 is assured.

Detaching Operation of Front Bumper in Attaching Mechanism 112

Upon completion of the clamp operation of the front bumper FB by the first robot 102 in this manner, the control unit drives the corresponding nut runner mechanisms 174 of the attaching mechanism 112 in the front bumper supply apparatus 106 in a reverse direction, and in the case of the large-size front bumper FB1, releases the threadable engagement of the nut portions 184 of the nut runner mechanisms 174a through 174d with the attaching bolts 28a through 28d inserted in the pairs of attaching holes 154a and 154d formed in the right and left first receive bases 148a and 148b. As a result, the front bumper FB1 is detachable from the attaching mechanism 112. On the other hand, in the case of the small-size front bumper FB2, the control unit releases the threadable engagement of the nut portions 184 of the nut runner mechanisms 174e through 174h with the attaching bolts 48a through 48d inserted in the two pairs of attaching holes 172a through 172d formed in the right and left second receive bases 150a and 150b. As a result, the front bumper FB2 is detachable from the attaching mechanism 112.

Thereafter, the control unit moves the clamp device 260 forward to detach the front bumper FB from the attaching mechanism 112 and moves the front bumper FB clamped by the clamp device 260 to a position opposing the front bumper attaching portion of the front portion of the vehicle body B by rotating the vertical arm 252 of the first robot 102 about the vertical axis, vertically moving the arm 252 along the vertical axis, and properly reciprocally driving the second horizontal arm 256 from the first horizontal arm 254.

Mounting Operation of Clamped Front Bumper to Vehicle Body

When the front bumper FB clamped by the clamp device 260 of the first robot 102 is moved to the position opposing the front bumper attaching portion of the front portion of the vehicle body B, the control unit moves the clamp device 260 backward. As a result, when the front bumper FB to be mounted is the large-size front bumper FB1, the reference pins 26a and 26b respectively attached to the pair of right and left attaching bases 24a and 24b of the front bumper FB1 are inserted in reference holes (not shown) formed in receive bases (not shown) of the vehicle body, thereby accurately regulating the relative positional relationship between the front bumper FB1 and the vehicle body. As a result, the pairs of attaching bolts 28a through 28d attached to the attaching bases 24a and 24b are respectively inserted in attaching holes (not shown) formed in the receive bases of the vehicle body. On the other hand, when the front bumper FB to be mounted is the small size front bumper FB2, the reference pins 46a and 46b respectively attached to the pair of right and left attaching bases 44a and 44b of the front bumper FB2 are inserted in reference holes (not shown) formed in receive bases (not shown) of the vehicle body, thereby accurately regulating the relative positional relationship between the front bumper FB2 and the vehicle body. As a result, the pairs of attaching bolts 48a through 48d attached to the attaching bases 44a and 44b are respectively inserted in attaching holes (not shown) formed in the receive bases of the vehicle body.

Thereafter, the control unit drives the second robot 104 (to be described later) and threadably engages nuts with the attaching bolts 28a through 28d (48a to 48d) inserted in the attaching holes. In this manner, the front bumper FB is mounted on the front portion of the vehicle body B.

Unclamp Operation of Front Bumper Mounted on Vehicle Body in Clamp Device

When the front bumper FB is mounted on the front portion of the vehicle body B in this manner, the control unit starts the unclamp operation of the front bumper FB in the clamp device 260. More specifically, the control unit drives the deviation mechanisms 406 in the lock mechanisms 274 in the reverse direction to move the lock pieces 392 backward, i.e., to the standby positions. As a result, the locking state of the extending portion 32 (52) of the front bumper FB by the lock pieces 392 is released. Thereafter, the control unit moves the entire clamp device 260 forward. As a result, the lock pieces 392 are disengaged forward from the opening 30 (50) of the front bumper FB. In this manner, the clamp state of the clamp device 260 to the front bumper FB mounted on the vehicle body B is released, and the clamp device 260 is completely separated from the front bumper FB. More specifically, the unclamp operation of the front bumper FB mounted on the vehicle body B in the clamp device 260 is completed, and the front bumper FB is independently mounted on the vehicle body B. The control unit drives the first robot 102 to return the clamp device 260 to the standby position.

In this manner, a series of clamp operations by the first robot 102 are completed.

Description of Second Robot 104

The second robot 104 will be briefly described below since it does not constitute a characteristic feature of the present invention.

More specifically, as has been described in the paragraph of <Unclamp Operation of Front Bumper Mounted on Vehicle Body in Clamp Device>, the second robot 104 threadably engages the nuts with the corresponding attaching bolts 28a through 28d (48a through 48d) of the front bumper FB attached to the front portion of the vehicle body B, thereby fixing the attaching state of the front bumper FB to the front portion of the vehicle body B, i.e., mounting the front bumper FB to the front portion of the vehicle body B. For this purpose, the second robot 104 comprises a nut runner device 430 attached to a distal end arm in addition to a known arm arrangement. The nut runner device 430 has substantially the same arrangement as the above-mentioned nut runner mechanism 174, except that nuts to be threadably engaged with the attaching bolts 28a to 28d (48a through 48d) are detachably attached unlike in the nut runner mechanism 174 which integrally comprises the nut portion 184.

The second robot 104 moves the nut runner device into an engine room which is open by opening a bonnet in advance, and threadably engages nuts with the corresponding attaching bolts 28a through 28d (48a through 48d) of the front bumper FB attached to the front portion of the vehicle body B, thereby fixing the front bumper FB to the front portion of the vehicle body B.

Since the front bumper assembling station 100 is arranged as described above, the front bumper FB can be reliably assembled to the front portion of the vehicle body B in an accurately positioned state.

Detailed Description of Rear Bumper Assembling Station 500

The arrangement of the rear bumper assembling station 500 for assembling the rear bumper FB to the rear portion of the vehicle body B will be described in detail below with reference to FIGS. 25 through 28. Since the rear bumper assembling station 500 has basically the same arrangement as that of the above-mentioned front bumper assembling station 100, only differences from the front bumper assembling station 100 will be described below, and a description of the same portions will be omitted.

Description of Differences from Front Bumper Assembling Station

More specifically, the rear bumper assembling station 500 has the following differences from the front bumper assembling station 100:

(1) The rear bumper RB to be assembled is attached in a state common to all the types of vehicle bodies B. For this reason, the rear bumpers RB need not be classified unlike the front bumpers FB, which are classified into large- and small-size front bumpers FB1 and FB2.

(2) The rear bumper RB is not formed with an opening in its bumper main body 60, as shown in FIG. 4.

(3) Therefore, there is no member corresponding to the extending portion 32 (52) extending backward from the upper edge of the opening 30 (50), and positioning holes 72a and 72b corresponding to the positioning holes 34a and 34b (54a and 54b) of the front bumper FB are formed in the lower surfaces of the stays 62a and 62b, as shown in FIG. 4.

(4) The positioning holes 72a and 72b are commonly set regardless of the types of rear bumpers RB.

(5) The attaching holes 70a and 70b defined by elongated holes extending in the BL direction are formed in the attaching bases 64a and 64b.

As has already been described in the paragraph of {General Description of Rear Bumper Assembling Station}, the operations, as the gist of the present invention, for fastening a bumper to the attaching mechanism in the same state as the fastening state to the vehicle body, clamping the bumper by the clamp device attached to the robot, thereafter, releasing the fastening state to detach the clamped bumper from the attaching mechanism, and fastening the detached bumper to the rear portion of the vehicle body B are attained without modifications.

Description of Attaching Mechanism 512

More specifically, the rear bumper supply apparatus 506 for supplying the rear bumper RB from the receive position P4 to the supply position P3 comprises the attaching mechanism 512 on which the rear bumper RB is temporarily attached, and the convey mechanism 510 for reciprocally moving the attaching mechanism 512 between the receive position P4 and the supply position P3. The convey mechanism 510 has substantially the same arrangement as that of the convey mechanism 110 of the front bumper supply apparatus 106, and only the attaching mechanism 512 has basically the same arrangement as the attaching mechanism 112 of the front bumper supply apparatus 106 except for details.

Figure 25:
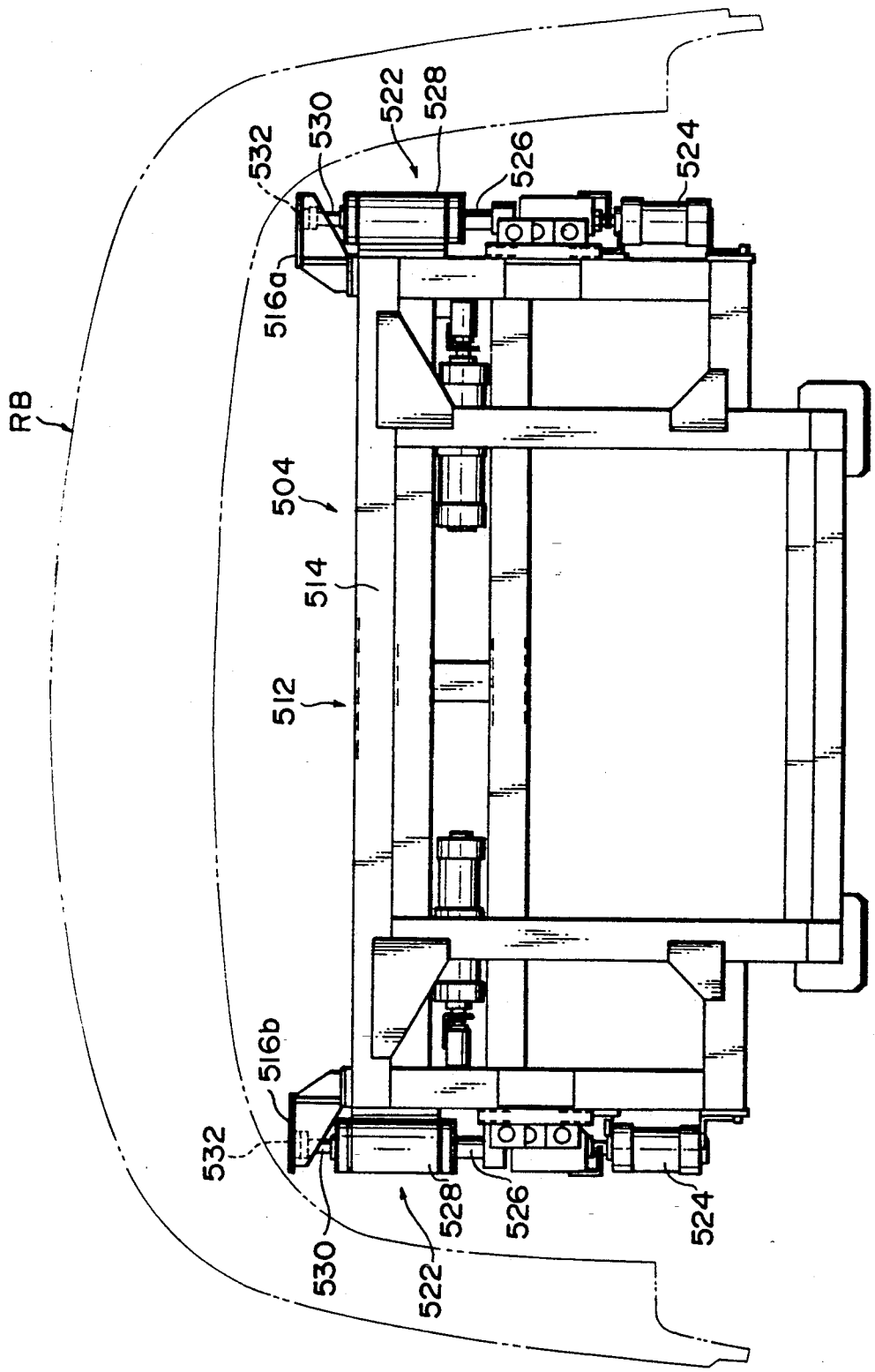
FIG. 25 is a sectional view showing a rear bumper supply apparatus in the same viewing state as in FIG. 9.
Figure 26:
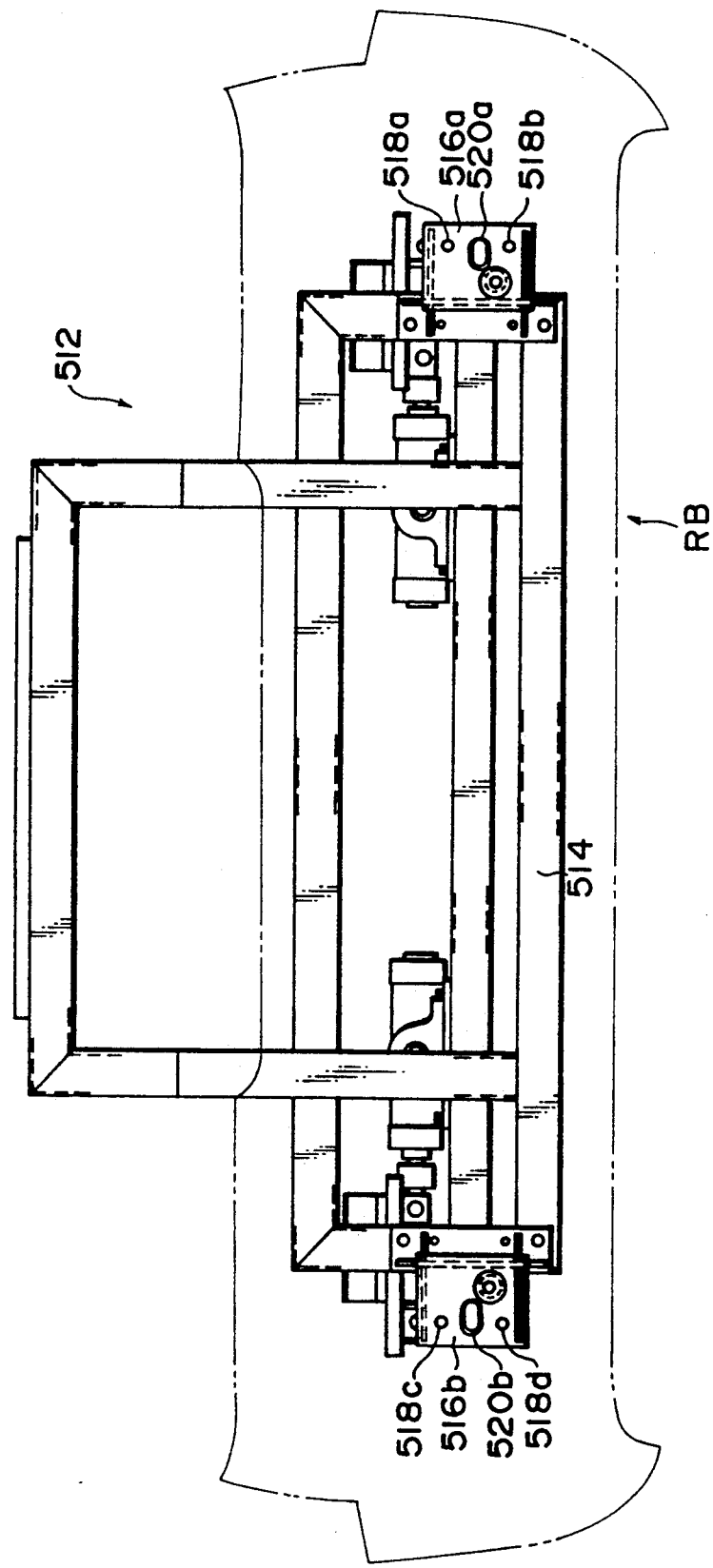
FIG. 26 is a sectional view showing the rear bumper supply apparatus in the same viewing state as in FIG. 10.

More specifically, as shown in FIGS. 25 and 26, the attaching mechanism 512 comprises a pair of receive bases 516a and 516b for receiving the attaching bases 64a and 64b corresponding to the rear bumper RB at two ends of an attaching frame 514 in a fixed state common to all the types of rear bumpers RB. The positioning pins 66a and 66b are respectively inserted in the upper surfaces serving as receive surfaces of the receive bases 516a and 516b so as to accurately define the relative positional relationship between the receive bases 516a and 516b and the attaching bases 64a and 64b. Pairs of attaching holes 518a and 518b; and 518c and 518d for receiving the corresponding attaching bolts 68a and 68b; and 68c and 68d are formed in the receive bases 516a and 516b. These attaching bolts 68a to 68d are not used for fastening (fixing) the attaching state to the attaching mechanism 512, but are used in a fastening operation of the bumper to the rear portion of the vehicle body B.

As the characteristic feature of the rear bumper RB, insertion holes 520a and 520b are respectively formed in the receive bases 516a and 516b, and are defined by elongated holes extending in the BL direction. The insertion holes 520a and 520b can perfectly coincide in shape with and entirely communicate with the corresponding attaching holes 70a and 70b in a state wherein the rear bumper RB is aligned and attached to the attaching mechanism 512 through the positioning pins 66a and 66b. More specifically, in this rear bumper attaching mechanism 512, the rear bumper RB is fastened (fixed) to the rear bumper attaching mechanism 512 using fastening mechanisms 522 each comprising one type of lock mechanism without using the nut runner mechanisms 174, while the front bumper attaching mechanism 112 fastens (fixes) the front bumper FB attached thereto using the nut runner mechanisms 174 (174a to 174h).

Description of Fastening Mechanism 522

More specifically, as shown in FIG. 25, the fastening mechanisms 522 are arranged on the two side surfaces of the attaching frame 514 to be located at positions immediately below the corresponding receive bases 516a and 516b. Each fastening mechanism 522 comprises an air cylinder 524, a piston rod 526 attached to the air cylinder 524 to be retractable therefrom along the central axis of the attaching frame 514, a pivot mechanism 528 connected to the distal end of the piston rod 526, a pivot shaft 530 extending upward from the pivot mechanism 528 along the central axis to be pivotal about the central axis within at least a 90° pivot range, and a lock piece 532 integrally attached to the distal end of the pivot shaft 530 and elongated to have a size smaller than the corresponding insertion hole 520a or 520b and the corresponding attaching hole 70a or 70b.

In the standby state of the air cylinder 524, the corresponding piston rod 526 is retracted downward, so that the lock piece 532 is located below the corresponding receive base 516a or 516b. When the air cylinder 524 is driven, the corresponding piston rod 526 projects upward, so that the lock piece 532 extends above the corresponding receive base 64a or 64b of the rear bumper RB through the corresponding insertion hole 520a or 520b and the corresponding attaching hole 70a or 70b. In the standby state of the pivot mechanism 528, the corresponding pivot shaft 530 is located at a position where the lock piece 532 attached to the distal end of the shaft 530 extends in the BL direction. When the pivot mechanism 528 is driven, it pivots the corresponding pivot shaft 530 through 90° to extend the lock piece 532 in a direction perpendicular to the BL direction, thereby locking the corresponding attaching hole 70a or 70b.

In the fastening mechanism 522 with the above arrangement, when a fastening operation is started from the standby state, the air cylinder 524 is driven to extend the lock piece 532 above the corresponding receive base 64a or 64b of the rear bumper RB through the corresponding insertion hole 520a or 520b and the corresponding attaching hole 70a or 70b. In this state, the pivot mechanism 528 is then driven to pivot the lock piece 532 through 90°. As a result, the lock pieces 532 can lock the corresponding attaching bases 64a and 64b. The air cylinder 524 is driven in the reverse direction to retract the corresponding piston rod 526 toward the standby position. As a result, each lock piece 532 overlaps the attaching hole 70a or 70b of the corresponding attaching base 64a or 64b in a cross shape, and the two ends of the lock piece are engaged with the peripheral portion of the corresponding attaching hole 70a or 70b, thereby locking the corresponding attaching base 64a or 64b. In this manner, the rear bumper RB is fastened to the attaching mechanism 512 through the fastening mechanism 522.

Description of Third Robot 502

The third robot 502 has basically the same arrangement as that of the first robot 102 for the front bumper FB, except that a clamp device 534 detachably attached to the distal end of the robot includes a different portion. In particular, as shown in FIG. 27, the arrangement of a gripping mechanism 536 corresponding to the gripping mechanism 270 for the front bumper FB, the arrangement without the lock mechanisms 274 since the rear bumper RB has no opening 30 or 50, as shown in FIG. 4, and the arrangement of positioning pins are different from those of the first robot 102.

Figure 27:
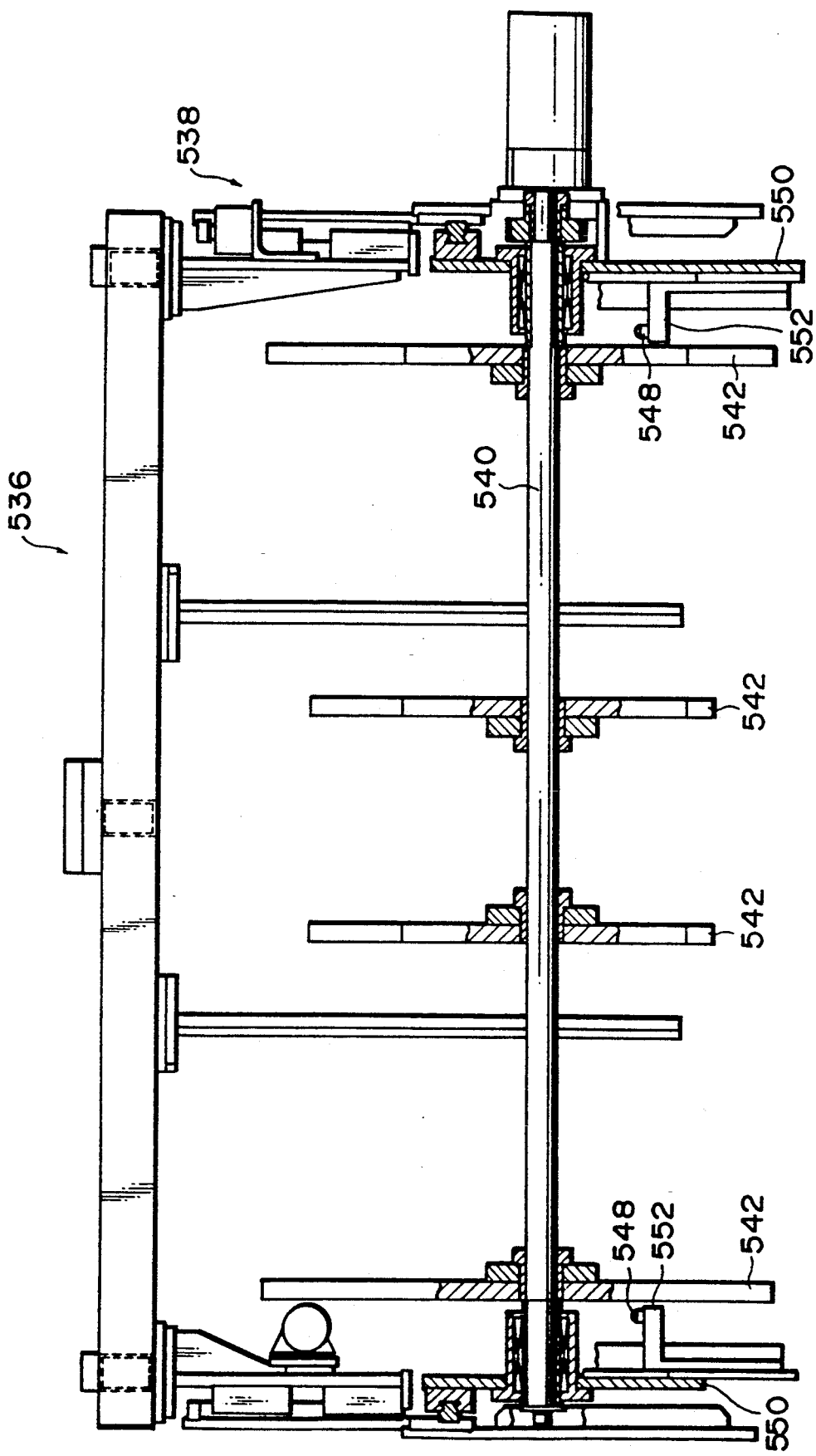
FIG. 27 is a front view showing the arrangement of a clamp device detachably attached to a third robot equipped in a rear bumper assembling station.
Figure 28:
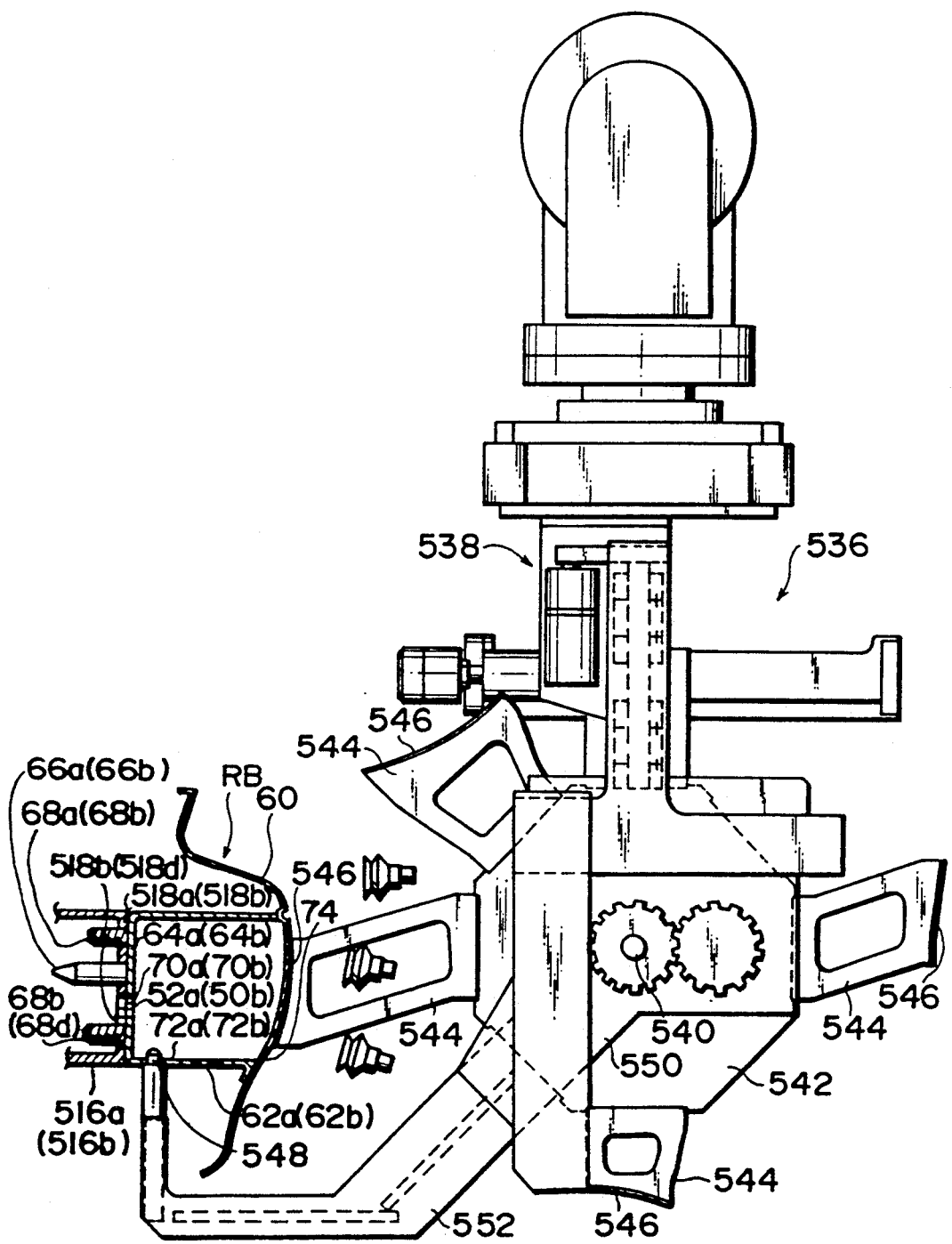
FIG. 28 is a side view showing the arrangement of the clamp device shown in FIG. 25.

More specifically, as shown in FIG. 27, in the gripping mechanism 536 for the rear bumper RB, a BL floating shaft 540, which is axially supported to be pivotal about an axis extending in the BL direction comprises four fixed rotary plates 542 in the BL direction in a state wherein the shaft 540 floats in the BL, TL, and WL directions by a 3-axis floating device 538 having the same arrangement as the 3-axis floating device 268 for the front bumper FB. Each rotary plate 524 has a regular octagonal shape, as shown in the side view of FIG. 28. In this manner, when the rotary plate 542 is formed in the regular octagonal shape, gripping jigs 544 can be provided to the respective sides. As a result, the single clamp device 538 can selectively clamp a maximum of eight different rear bumpers RB. In this embodiment, as shown in FIG. 28, four gripping jigs 544 are attached to each rotary plate 542.

Positioning pins 548 stand upright on the distal ends extending forward from TL floating plates 550 through stays 552 at two side positions in the BL direction. The positioning pins 548 can be inserted in the positioning holes 72a and 72b so as to accurately regulate the relative positional relationship between gripping surfaces of the gripping jigs 544 and a surface 74 to be gripped defined on the outer surface of the bumper main body 60 of the rear bumper RB, and to position the gripping surfaces 546, so that they can be satisfactorily in tight contact with the surface 74 to be gripped. More specifically, as described above, since the positioning holes 72a and 72b in the rear bumper RB are set common to all the types of rear bumpers RB, the positioning pins 548 are fixed to the corresponding TL floating plates 550 in a state common to all the gripping jigs 544 independently of the gripping jigs 544 unlike in the front bumper FB which has the positioning pins 348 in correspondence with the gripping jigs.

Since the rear bumper assembling station 500 is arranged as described above, the rear bumper RB can be satisfactorily assembled to the rear portion of the vehicle body B in an accurately aligned state in substantially the same manner as the above-mentioned front bumper assembling station 100.

In temporary assembling of the front bumper FB to the vehicle body B, when the front bumper FB cannot be satisfactorily aligned with the vehicle body B, the reference pins provided to the front bumper FB are pressed by the vehicle body B in a direction opposite to the convey direction of the robot, and position sensors detect that a moving amount from one origin exceeds a predetermined amount, the front bumper FB is detached to prevent its outer surface portion from being damaged.

In the embodiment described above, a receive body is a vehicle conveyed along a line, and elongated works are flexible front and rear bumpers. However, the present invention is not limited to these. For example, the elongated works also include side laces attached to the side surfaces of a vehicle, a trunk lid lace attached to a trunk lid, a decoration garnish, and the like. The present invention can also be suitably applied to these elongated works, which particularly have integrated fixing portions, and have different fixing positions of the fixing portions and different total lengths in the longitudinal direction.

As many apparently widely different embodiments of the present invention can be made without departing from the spirit and scope thereof, it is to be understood that the invention is not limited to the specific embodiments thereof except as defined in the appended claims.

What is claimed is:

1. An elongated work assembling method for fastening a flexible elongated work having an integrated fixing member to a receive body, comprising:

a first placing step of placing and fixing the elongated work on an attaching mechanism arranged at one side along a continuous convey direction of said receive body;

a first fastening step of fastening the placed elongated work to said attaching mechanism in substantially the same fastening state as a final fastening state to the receive body;

a clamping step of clamping the elongated work in the fastening state to said attaching mechanism;

a fastening state releasing step of releasing the fastening state of the elongated work on said attaching mechanism;

a moving step of detaching from said attaching mechanism the elongated work released from the fastening state, and moving the detached elongated work to the receive body; and a second fastening step of finally fastening the moved elongated work to the receive body from an opposite direction against the continuous convey direction.

2. An elongated work assembling method for fastening, a large number of types of flexible elongated works, which have different total lengths in a longitudinal direction, different cross-sectional shapes each defining a portion of an outer surface, and different attaching positions of fixing members to be fastened to a receive body, to a receive portion of each of the receive bodies which are continuously conveyed from an upstream side to a downstream side, comprising:

a first placing step of placing the elongated work on an attaching mechanism arranged at one side along a direction of a continuous convey operation using the fixing member of the elongated work;

a first fastening step of fastening the placed elongated work to said attaching mechanism in substantially the same fastening state as a final fastening state to the receive body;

a clamping state of clamping the elongated work using the cross-sectional shape of the elongated work in the fastening state to said attaching mechanism;

a fastening state releasing step of releasing the fastening state on the elongated work in said attaching mechanism;

a moving step of detaching from said attaching mechanism the elongated work released from the fastening state, and moving the detached elongated work to a position opposing the receive portion of the receive body; and a second fastening step of finally fastening the moved elongated work to the receive body from an opposite direction against the continuous convey direction.

3. The method according to claim 2, wherein
said attaching mechanism is arranged to be movable between a receive position adjacent to a stock unit of the elongated works, and a supply position adjacent to the receive body,
the first placing step and the first fastening step are executed at the receive position,
said method further comprises the attaching mechanism convey step of moving said attaching mechanism from the receive position to the supply position after the first fastening step is ended, and
the clamping step and the fastening state releasing step are executed at the supply position.

4. The method according to claim 2, wherein
the first placing step includes the step of causing an operator to pick up the elongated work from a stock unit and to place the picked up elongated work on said attaching mechanism which is obliquely arranged, and
the clamping step and the moving step are executed by an assembling robot having an arm portion, which can escape from a path defined by the continuous convey operation and can extend to the path.

5. An elongated work assembling method for fastening a large number of types of flexible elongated works, which have different total lengths in a longitudinal direction, different cross-sectional shapes each defining a portion of an outer surface, and different attaching positions of a pair of right and left fixing members to be fastened to a receive body, to the receive bodies which are continuously conveyed in a substantially horizontal state from an upstream side to a downstream side, comprising:
a first placing step of placing the elongated work on an attaching mechanism arranged at one side along a direction of a continuous convey operation using the fixing members of the elongated work;
a first fastening step of fastening the placed elongated work to said attaching mechanism in substantially the same fastening state as a final fastening state to the receive body;
a clamping step of clamping the elongated work using the cross-section shape of the elongated work in the fastening state to said attaching mechanism;
a fastening state releasing step of releasing the fastening state of the elongated work on said attaching mechanism;
a moving step of detaching from said attaching mechanism the elongated work released from the fastening state, and moving the detached elongated work to a position opposing the receive portion of the receive body; and
a second fastening step of finally fastening the moved elongated work to the receive body from an opposite direction against the continuous convey direction.

6. The method according to claim 5, wherein
the elongated works are front and rear bumpers for a vehicle, and the receive body is a vehicle which is continuously conveyed,
the vehicle has a front receive portion to which the front bumper is to be fastened, and a rear receive portion to which the rear bumper is to be fastened,
the front bumper is finally fastened to the front receive portion in a first stop station comprising the first placing step, the first fastening step, the clamping step, the fastening state releasing step, the moving step, and the second fastening step, and
the rear bumper is finally fastened to the rear receive portion in a second stop station comprising the first placing step, the first fastening step, the clamping step, the fastening state releasing step, the moving step, and the second fastening step, and said first and second stop stations are arranged along the direction of the continuous convey operation of the vehicle to finally fasten the front and rear bumpers.

7. The method according to claim 5, wherein
said first stop station, an intermediate stop station at which the vehicle is temporarily stopped to be conveyed to said second stop station after the front bumper is fastened in said first stop station, and said second stop station are arranged in turn from the upstream side to the downstream side along the direction of the continuous convey operation of the vehicle, and the vehicle to which the front bumper is finally fastened in said first stop station stands by in said intermediate stop station.

8. The method according to claim 5, wherein
the clamping step includes the step of selecting predetermined clamping means in the moving step to allow setting and clamping of a desired one of the large number of types of elongated works.

9. The method according to claim 5, wherein
the clamping step comprises:
the selection step of bringing gripping portions matching with the predetermined elongated work to be finally fastened to predetermined gripping positions;
the positioning step of accurately positioning a relative position of gripping surfaces corresponding to the outer surface of the elongated work to be gripped; and
the chucking step of chucking the outer surface of the elongated work to bring the outer surface to be in tight contact with the corresponding gripping surfaces.

10. The method according to claim 9, wherein
the selection step includes the step of rotating selection means supported to be pivotal about a longitudinal axis of the elongated work to selectively bring the desired gripping surfaces to the predetermined gripping positions.

11. The method according to claim 10, wherein
the positioning step includes the step of engaging positioning hole portions arranged according to an outer surface shape corresponding to the outer surface of the elongated work with positioning pins arranged in correspondence with the gripping surfaces at positions corresponding to the positioning hole portions.

12. The method according to claim 10, wherein
the positioning step includes the step of positioning the elongated work with the gripping surfaces by locking a portion of an outer surface shape corresponding to the outer surface of the elongated work.

13. The method according to claim 5, wherein
the elongated work moved in the moving step is positioned at a predetermined position with respect to the receive body in a state wherein the elongated work is movable in a back-and-forth direction along the direction of the continuous convey operation, a right-and-left direction perpendicular to the direction of the continuous convey operation, and an up-and-down direction perpendicular to the direction of the continuous convey operation.

* * * * *

UNITED STATES PATENT AND TRADEMARK OFFICE
CERTIFICATE OF CORRECTION

PATENT NO. : 5,301,411                               Page 1 of 3
DATED      :
             APRIL 12, 1994
INVENTOR(S) :
             HIDEKI FUJIWARA, et al.

It is certified that error appears in the above-indentified patent and that said Letters Patent is hereby corrected as shown below:

TITLE PAGE [57] ABSTRACT, line 16, "means" should be --apparatus--.

Col. 6,    line 31, "reference o" should be --reference--.

Col. 11,   line 12, "to" should be --through--;
           line 19, "to" should be --through--.

Col. 14,   line 2, "to" should be --through--;
           line 41, "to" (both occurrences) should be --through--.

Col. 15,   line 64, "to" (both occurrences) should be --through--.

Col. 16,   line 8, "to" should be --through--;

UNITED STATES PATENT AND TRADEMARK OFFICE
CERTIFICATE OF CORRECTION

PATENT NO. : 5,301,411
DATED : APRIL 12, 1994
INVENTOR(S) : Hideki FUJIWARA, et al.

It is certified that error appears in the above-indentified patent and that said Letters Patent is hereby corrected as shown below:

Col. 17,    line 48, "respectively," should be --respectively--;
            lines 65-66, "Description of Arrangement of First Robot 102" should be centered as a title.

Col. 22,    line 7, "a" should be deleted.

Col. 23,    line 57, "bumper" should be --bumper.--;
            line 64, "342eattached" should be --342e attached--.

Col. 24,    line 10, "to" should be --through--;
            line 11, "to" (all occurrences) should be --through--;
            line 34, "to" (both occurrences) should be --through--;
            line 35, "to" should be --through--.

Col. 26,    line 48, "to" should be --through--.

Col. 28,    line 67, "to" should be --through--.

UNITED STATES PATENT AND TRADEMARK OFFICE
CERTIFICATE OF CORRECTION

PATENT NO. : 5,301,411                    Page 3 of 3
DATED : APRIL 12, 1994
INVENTOR(S) : Hideki FUJIWARA, et al.

It is certified that error appears in the above-indentified patent and that said Letters Patent is hereby corrected as shown below:

Col. 29,   line 4, "to" (both occurrences) should be --through--;
           line 5, "to" should be --through--;
           line 16, "to" (first occurrence) should be --through--;

Col. 31,   line 41, "to" should be --through--.

Col. 32,   line 27, "to" should be --through--.

Signed and Sealed this

Twenty-second Day of August, 1995

Attest:

BRUCE LEHMAN

Attesting Officer          Commissioner of Patents and Trademarks